United States Patent
Akahoshi et al.

(10) Patent No.: US 9,208,035 B2
(45) Date of Patent: Dec. 8, 2015

(54) OPTICAL INFORMATION RECORDING AND REPRODUCING APPARATUS, OPTICAL INFORMATION RECORDING AND REPRODUCING METHOD, AND DATA LIBRARY APPARATUS

(71) Applicant: Hitachi Consumer Electronics Co., Ltd., Tokyo (JP)

(72) Inventors: Kenji Akahoshi, Yokohama (JP); Masayuki Hirabayashi, Yokohama (JP)

(73) Assignee: HITACHI CONSUMER ELECTRONICS CO., LTD., Tokyo (JP)

( * ) Notice: Subject to any disclaimer, the term of this patent is extended or adjusted under 35 U.S.C. 154(b) by 167 days.

(21) Appl. No.: 13/874,559

(22) Filed: May 1, 2013

(65) Prior Publication Data
US 2014/0006857 A1    Jan. 2, 2014

(30) Foreign Application Priority Data
Jun. 29, 2012    (JP) .................................. 2012-146304

(51) Int. Cl.
| | | |
|---|---|---|
| G06F 11/00 | (2006.01) | |
| G06F 11/14 | (2006.01) | |
| G11B 7/0065 | (2006.01) | |
| G11B 20/10 | (2006.01) | |
| G11B 20/18 | (2006.01) | |

(52) U.S. Cl.
CPC .......... *G06F 11/1474* (2013.01); *G11B 7/0065* (2013.01); *G11B 20/10* (2013.01); *G11B 20/18* (2013.01); *G06F 11/1443* (2013.01)

(58) Field of Classification Search
USPC ............................................ 714/16
See application file for complete search history.

(56) References Cited

U.S. PATENT DOCUMENTS

| | | | | |
|---|---|---|---|---|
| 3,638,185 | A * | 1/1972 | Dell et al. .................... | 714/2 |
| 4,162,536 | A * | 7/1979 | Morley ........................ | 714/18 |
| 6,295,596 | B1 * | 9/2001 | Hirabayashi et al. ......... | 714/762 |
| 2008/0225670 | A1 | 9/2008 | Shimada et al. | |
| 2009/0073850 | A1 | 3/2009 | Ide et al. | |

(Continued)

FOREIGN PATENT DOCUMENTS

| | | |
|---|---|---|
| JP | 2005-235331 | 9/2005 |
| JP | 2008-226433 | 9/2008 |

(Continued)

*Primary Examiner* — Kamini Patel
(74) *Attorney, Agent, or Firm* — Baker Botts L.L.P.

(57) ABSTRACT

An optical information recording and reproducing apparatus and an optical information recording and reproducing method which make it possible to conduct alternation processing efficiently even if a buffer capacity is limited, in retry processing at time when a verify error is detected are provided. In an optical information recording and reproducing apparatus for recording data onto optical information recording media and reproducing data from the optical information recording media, verify processing is conducted in a predetermined recording quantity unit. Upon detection of a verify error in recorded data, a host computer is requested to retransfer data which has caused the verify error, and received data is intruded in a next scheduled recording quantity unit and recorded onto the optical information recording media.

3 Claims, 14 Drawing Sheets

(56) References Cited

U.S. PATENT DOCUMENTS

| | | | |
|---|---|---|---|
| 2009/0080313 A1* | 3/2009 | Shimada et al. | 369/103 |
| 2009/0086607 A1* | 4/2009 | Fukushima | 369/103 |
| 2009/0296558 A1* | 12/2009 | Akahoshi | 369/103 |
| 2009/0310463 A1* | 12/2009 | Nagai et al. | 369/103 |
| 2010/0208562 A1 | 8/2010 | Iizuka | |
| 2010/0226232 A1 | 9/2010 | Katsuki | |
| 2011/0002206 A1* | 1/2011 | Akahoshi | 369/47.14 |
| 2012/0224465 A1* | 9/2012 | Akahoshi | 369/47.14 |

FOREIGN PATENT DOCUMENTS

| | | |
|---|---|---|
| JP | 2009-70475 | 4/2009 |
| JP | 2009-76171 | 4/2009 |
| JP | 2009-87447 | 4/2009 |
| JP | 2009-87452 | 4/2009 |
| JP | 2009-87489 | 4/2009 |
| JP | 2009-289384 | 12/2009 |
| JP | 2009-301627 | 12/2009 |
| JP | 2010-44825 | 2/2010 |

* cited by examiner

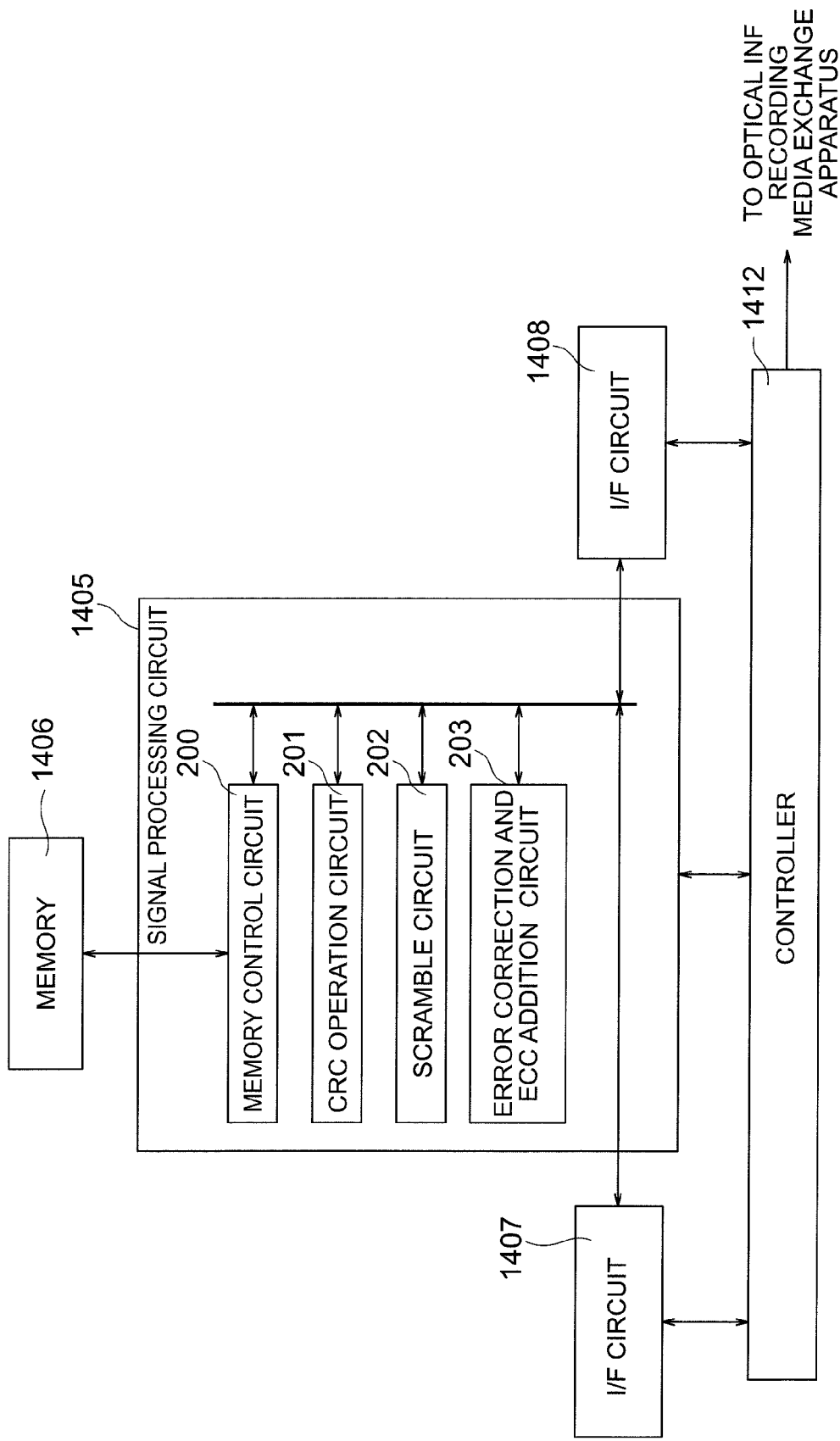

OPTICAL INFORMATION RECORDING AND REPRODUCING APPARATUS, OPTICAL INFORMATION RECORDING AND REPRODUCING METHOD, AND DATA LIBRARY APPARATUS

INCORPORATION BY REFERENCE

The present application claims priority from Japanese application JP 2012-146304 filed on Jun. 29, 2012, the content of which is hereby incorporated by reference into this application.

BACKGROUND OF THE INVENTION

The present invention relates to an optical information recording and reproducing apparatus, an optical information recording and reproducing method, and a data library apparatus in which information is recorded by using holography.

In the midst of studies conducted concerning the storage technique in the next generation, the hologram recording technique in which digital information is recorded utilizing the holography is attracting attention.

The hologram recording technique is a technique of superposing a signal beam having information of page data modulated two-dimensionally by a spatial light modulator on a reference beam within recording media, causing refractive index modulation in the recording media by using an interference fringe pattern generated at that time, and thereby recording information. When reproducing information, the recording media is irradiated with the reference beam used at the time of recording in the same arrangement and consequently a hologram recorded in the recording media acts like a diffraction grating and generates a diffracted beam. This diffracted beam is reproduced as the same beam as the recorded signal beam inclusive of phase information.

The reproduced signal beam is detected fast two-dimensionally by using photodetectors such as CMOSs or CCDs. In such hologram recording, two-dimensional information is recorded/reproduced simultaneously by using one hologram and a plurality of page data can be written in superposition on the same place. Therefore, such hologram recording is effective for fast recording and reproducing of a large capacity of information.

On the other hand, since a capacity of multiple recording on the same place is large, there is a problem that the hologram recording is highly wasteful when recording a small amount of data.

As a technique for solving this problem, there is, for example, a technique disclosed in JP-A-2009-301627 which corresponds to US 2009/0310463 A1, Nagai et al. According to JP-A-2009-301627, "even if data corresponding to a fraction part short of a book in capacity is generated in data to be subjected to multiplexed recording on the same volume in holographic recording when recording is finished, the data corresponding to the fraction part can be recorded not on holographic recording media but on an auxiliary recording device for a recording device. When conducting incremental recording, the data corresponding to the fraction part is read out from the auxiliary recording device, connected to input data to be incrementally recorded, and resultant data is recorded. As a result, it becomes possible to conduct incremental recording of data on the holographic recording media without waste."

SUMMARY OF THE INVENTION

The technique for incrementally recording data on holographic memory recording media without waste is described in JP-A-2009-301627 which corresponds to US 2009/0310463A1, Nagai et al. However, processing conducted when a verify error is caused, i.e., when recorded data cannot be read out correctly is not mentioned. A technique for recording data efficiently in retry, i.e., re-recording is not described.

Therefore, an object of the present invention is to provide an optical information recording and reproducing apparatus and an optical information recording and reproducing method which make it possible to record data efficiently in retry at the time when a verify error is detected.

In order to achieve the object, for example, a configuration described in claims is adopted.

The present application includes a plurality of means for attaining the object. An example of them is an optical information recording and reproducing apparatus for recording data onto optical information recording media and reproducing data from the optical information recording media, the optical information recording and reproducing apparatus including a storage unit for temporarily storing data sent from a host computer, a cure unit for conducting precure on the optical information recording media as a preprocess for recording and conducting postcure on the optical information recording media as a postprocess for recording, a recording unit for recording data stored in the storage unit onto an area subjected to the precure, in order, a verify unit for ascertaining a recording quality of the recorded data, a data request unit for requesting the host computer to retransfer data which has caused a verify error when the verify error is detected, and a control unit for generating retry data from retransferred data, precure being conducted by the cure unit, data being recorded in a pertinent place by the recording unit, and postcure being conducted by the cure unit, and upon detection of a verify error by the verify unit, the host computer being requested to retransfer data by the data request unit, retransferred data being intruded in a next scheduled recording quantity unit and stored in the storage unit by the control unit and being recorded onto the optical information recording media by the recording unit.

According to the present invention, it is possible to record data efficiently in retry for a verify error.

Objects, configurations and effects other than those described above will be elucidated by the ensuing description of embodiments.

BRIEF DESCRIPTION OF THE DRAWINGS

FIG. 14 is a block diagram showing a configuration of a library apparatus control circuit in the fourth embodiment.

DESCRIPTION OF THE EMBODIMENTS

Hereafter, embodiments will be described with reference to the drawings.

Embodiment 1

In an optical information recording and reproducing apparatus in a first embodiment according to the present invention, a signal beam and a reference beam are incident on optical information recording media so as to be superposed on each other and information is recorded by forming an interference fringe pattern. At this time, recording using angular multiplexing is possible by changing an incidence angle of the reference beam which is incident on the optical information recording media.

In a hologram recorded on a same area with reference beam angles changed, a hologram corresponding to each reference beam angle will be hereafter referred to as page, and a set of pages angular-multiplexed on the same area will be hereafter referred to as book.

Furthermore, when recording information in a desired position in the optical information recording media, a preprocess called precure is needed. In the precure, a desired position is previously irradiated with a predetermined optical beam before irradiating the desired position with a reference beam and a signal beam. After information is recorded in the desired position, a post-process called postcure is needed. In the postcure, the desired position is irradiated with a predetermined optical beam in order to make incremental recording in the desired position impossible.

Since each of the precure and postcure takes a predetermined processing time, it is necessary to conduct each processing on a plurality of books collectively in order to make the processing fast.

Here, an area of precure and postcure conducted once on a plurality of book areas is referred to as precure unit, and its data capacity is referred to as cure capacity. A data capacity which can be recorded by conducting the precure and postcure once is, for example, 2 G-bytes composed of 100 books, and this data capacity is the cure capacity. One book is, for example, 20 k-bytes composed of 300 pages.

Figure 1:
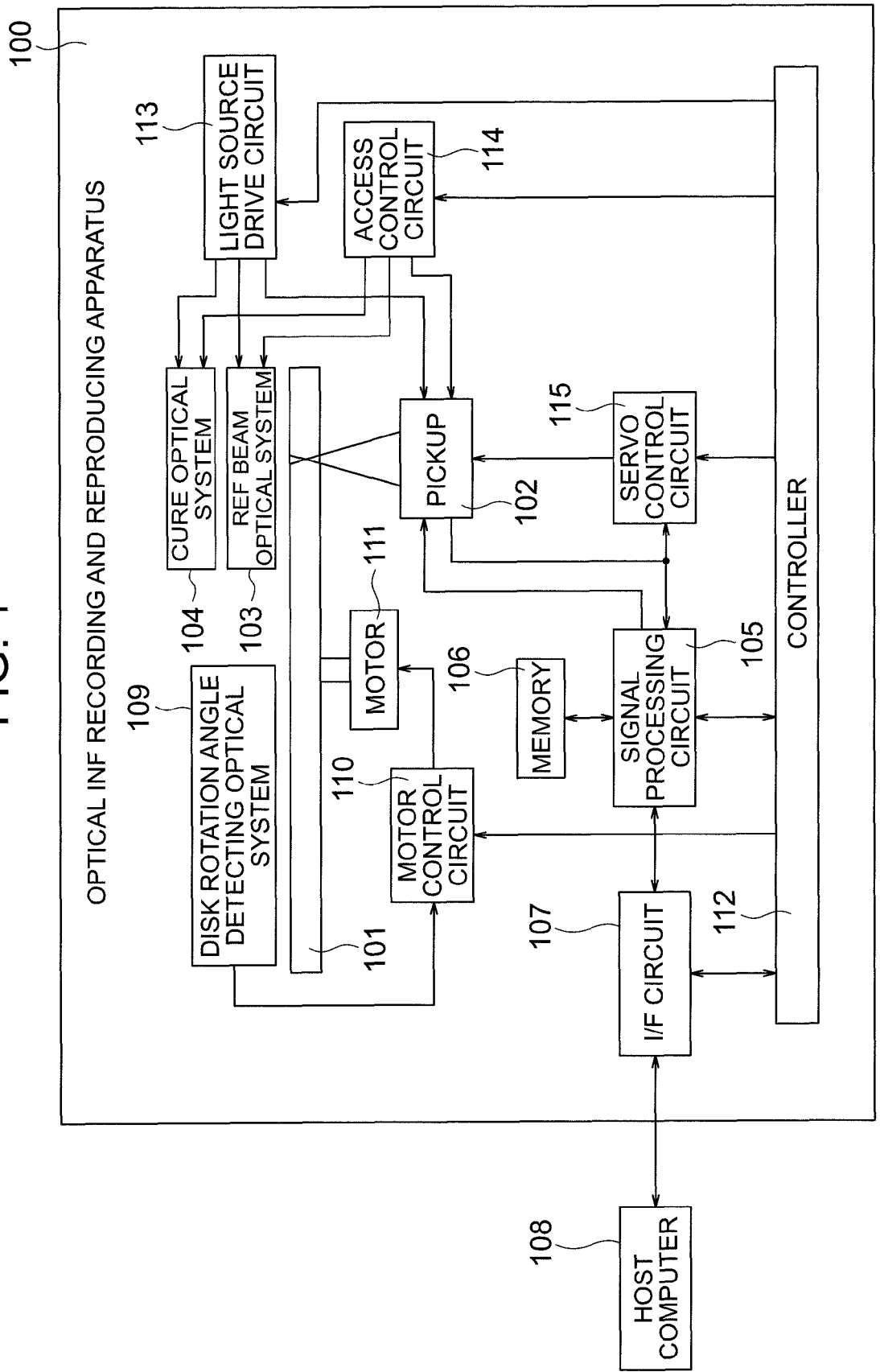
FIG. 1 is a block diagram showing a configuration of an optical information recording and reproducing apparatus in a first embodiment.

FIG. 1 is a block diagram showing a configuration of an optical information (INF) recording and reproducing apparatus in the first embodiment.

An optical information recording and reproducing apparatus 100 is connected to a host computer 108. The optical information recording and reproducing apparatus 100 records data input from the host computer 108, onto optical information recording media 101. Furthermore, the optical information recording and reproducing apparatus 100 outputs data, which is reproduced from the optical information recording media 101, to the host computer 108.

The optical information recording media 101 has a configuration which can be rotated by a rotating motor 111. Since a pickup 102, a reference (REF) beam optical system 103, and a cure optical system 104 are configured to be movable in the radial direction, information recording and reproducing can be conducted over the whole face of the optical information recording and reproducing media 101 by using holography.

For recording information, it is necessary to irradiate the optical information recording media 101 with a signal beam and a reference beam. The pickup 102 irradiates the optical information recording media 101 with the signal beam. The reference beam optical system 103 irradiates the optical information recording media 101 with the optical beam.

At this time, data to be recorded is sent into a spatial light modulator in the pickup 102 via a signal processing circuit 105, and the signal beam is modulated by the spatial light modulator.

For reproducing information from holography, it is necessary to irradiate the optical information recording media 101 with a reference beam and detect a reproduced beam. The reference beam optical system 103 irradiates the optical information recording media 101 with the reference beam. The pickup 102 detects a reproduced beam reproduced at that time by using a photodetector in the pickup 102, and sends a result of the detection to the signal processing circuit 105.

In addition, the pickup 102 detects a deviation quantity of the reference beam angle by using a mechanism for detecting the deviation quantity, and sends the deviation quantity to a servo control circuit 115.

The cure optical system 104 generates an optical beam to be used for the precure and postcure of the optical information recording media 101.

The signal processing circuit 105 sends data, which is sent from the host computer 108 via an interface (I/F) circuit 107, to a memory 106, divides the data into a plurality of data strings, adds an address to each data string, adds a CRC (Cyclic Redundancy Check) to each data string to make possible error detection at the time of reproducing, makes the number of on-pixels nearly equal to the number of off-pixels, conducts scrambling of adding a pseudo random number data string to each data string with the object of preventing repetition of the same pattern, and then adds an ECC (Error Correction Code) such as the Reed-Solomon code to make possible error correction at the time of reproducing.

And the signal processing circuit 105 converts the data string to M by N (where M and N are natural numbers) two-dimensional data, repeats the conversion by a number of times corresponding to one page data, and thereby constitutes two-dimensional data corresponding to one page. The signal processing circuit 105 adds markers, which become reference in image position detection and image distortion correction at the time of reproducing, to the two-dimensional data constituted in this way, and sends resultant data to the pickup 102.

Or the signal processing circuit 105 receives the detected image data from the pickup 102, detects an image position by using the markers included in the image data as reference, corrects image distortions such as the inclination, magnification and distortion, then conducts binarization processing, removes the markers, thereby acquires two-dimensional data corresponding to one page, and stores the two-dimensional data into the memory 106. The signal processing circuit 105 converts the two-dimensional data obtained in this way to a plurality of data strings, then conducts error correction processing, conducts descrambling, conducts error detection processing using the CRC, and sends resultant data strings to the host computer 108 via the interface circuit 107.

The memory 106 is a storage unit for temporarily storing data. The memory 106 is controlled by the signal processing circuit 105, and used as a buffer memory, an error correction code adding memory, an error correcting memory, and the like. The memory 106 may be any memory as long as it can retain data, such as, for example, the SSD (Solid State Drive), besides the DRAM (Dynamic Random Access Memory) and the SRAM (Static Random Access Memory). The memory 106 may be the HDD (Hard Disk Drive).

The interface circuit 107 conveys a recording/reproducing order given by the host computer 108, to a controller 112. Furthermore, the interface circuit 107 sends data sent from the signal processing circuit 105, to the host computer 108. Furthermore, the interface circuit 107 sends data sent from the host computer 108, to the signal processing circuit 105. The interface circuit 107 conducts data transfer based on a transfer system such as, for example, the SATA (Serial Advanced Technology Attachment), the SAS (Serial Attached SCSI) or the like.

The host computer 108 sends data to the optical information recording and reproducing apparatus 100, and orders the optical information recording and reproducing apparatus 100 to record the data. Furthermore, the host computer 108 orders the optical information recording and reproducing apparatus 100 to reproduce data, and receives the data.

A disk rotation angle detecting optical system 109 detects a rotation angle of the optical information recording media 101, and sends the rotation angle to a motor control circuit 110.

The motor control circuit 110 adjusts the rotation angle of the optical information recording media 101. When adjusting the optical information recording media 101 to a predetermined rotation angle, the rotation angle detecting optical system 109 detects a signal depending upon the rotation angle, the motor control circuit 110 controls the rotating motor 111 by using the detected signal, and thereby the rotation angle of the optical information recording media 101 is adjusted as ordered by the controller 112.

The rotating motor 111 is controlled by the motor control circuit 110 to rotate the optical information recording media 101.

The controller 112 controls respective units in the optical information recording and reproducing apparatus 100, and conducts data recording processing and data reproducing processing of the optical information recording media 101. The controller 112 may be constituted by using, for example, a CPU (Central Processing Unit). Alternatively, an arbitrary control circuit or a dedicated circuit such as an ASIC may be used.

A light source drive circuit 113 supplies predetermined light source drive currents to light sources in the pickup 102, the reference beam optical system 103 and the cure optical system 104, respectively. An optical beam is emitted with a predetermined quantity of light from each of the light sources.

A mechanism for sliding the position in the radial direction of the optical information recording and reproducing media 101 is provided in each of the pickup 102, the reference beam optical system 103, and the cure optical system 104. An access control circuit 114 exercises position control of them in response to an order given by the controller 112.

In the recording technique utilizing the principle of the angular multiplexing of holography, there is a tendency that the allowable error for the deviation of the reference beam angle becomes extremely small. Therefore, a deviation quantity of the reference beam angle given by the pickup 102 is input to the servo control circuit 115, and the servo control circuit 115 corrects the deviation quantity of the pickup 102.

As for the pickup 102, the reference beam optical system 103, the cure optical system 104 and the disk rotation angle detecting optical system 109, some optical system configurations or all optical system configurations may be thrown into one for simplification.

Operation of the optical information recording and reproducing apparatus 100 conducted when recording data on the optical information recording media 101 will now be described. Upon attachment of the optical information recording media 101 to the optical information recording and reproducing apparatus 100, the controller 112 conducts adjustment processing of the respective units, moves the pickup 102 and the reference beam optical system 103 respectively to predetermined positions by using the motor control circuit 110 and the access control circuit 114, reads out management information from the optical information recording media 101 via the pickup 102 and the signal processing circuit 105, and stores the management information into the memory 106.

And the controller 112 moves the pickup 102, the reference beam optical system 103 and the cure optical system 104 to their respective desired positions, by using the motor control circuit 110 and the access control circuit 114.

Upon sending of data from the host computer 108 to the optical information recording and reproducing apparatus 100, the controller 112 receives the data by using the interface circuit 107, stores the data into the memory 106, and conducts CRC addition, scrambling and error correction code addition by using the signal processing circuit 105.

And the controller 112 moves the pickup 102 and the reference beam optical system 103 to their respective desired positions by using the motor control circuit 110 and the access control circuit 114. The controller 112 conducts precure by using the cure optical system 104. The controller 112 reads out data from the memory 106, adds markers to the data, sends resultant data to the pickup 102, and records the resultant data onto the optical information recording media 101, by using the signal processing circuit 105. And the controller 112 conducts the postcure by using the cure optical system 104.

When conducting verify processing, i.e., when ascertaining whether recorded data can be read out correctly, image data detected from the optical information recording media 101 by the pickup 102 is sent to the signal processing circuit 105, the image position is detected by using the markers as reference, and distortions are corrected. Then, binarization processing is conducted, and two-dimensional data is acquired and stored into the memory 106. And the two-dimensional data is converted to a plurality of data strings, then error correction processing is conducted, descrambling is conducted, and error detection processing using the CRC is conducted. If an error is detected here, the controller 112 is informed of a verify error and the controller 112 conducts retry by controlling respective units. At the time of the retry, data resulting in non-coincidence is recorded in a head position of the next cure unit to be recorded.

Or the signal processing circuit 105 compares data at the time of recording with data at the time of verify processing.

Upon non-coincidence, the signal processing circuit 105 informs the controller 112 of a verify error.

And verify processing of the retried data is conducted, and a defect origin address and an alternating address are registered in management information as alternation information. If retry data also causes a verify error, retry processing is conducted again.

Operation of the optical information recording and reproducing apparatus 100 conducted when reproducing data from the optical information recording media 101 will now be described. Upon attachment of the optical information recording media 101 to the optical information recording and reproducing apparatus 100, the controller 112 conducts adjustment processing of the respective units, moves the pickup 102 and the reference beam optical system 103 to their respective predetermined positions by using the motor control circuit 110 and the access control circuit 114, reads out management information from the optical information recording media 101 via the pickup 102 and the signal processing circuit 105, and stores the management information into the memory 106.

And the controller 112 moves the pickup 102 and the reference beam optical system 103 to their respective desired positions by using the motor control circuit 110 and the access control circuit 114. The controller 112 writes data reproduced from the optical information recording media 101, into the memory 106. The controller 112 conducts error correction processing, descrambling, and error detection processing by using the signal processing circuit 105.

And the controller 112 reads out data from the memory 106, and sends the data to the host computer 108 via the interface circuit 107.

Figure 2:
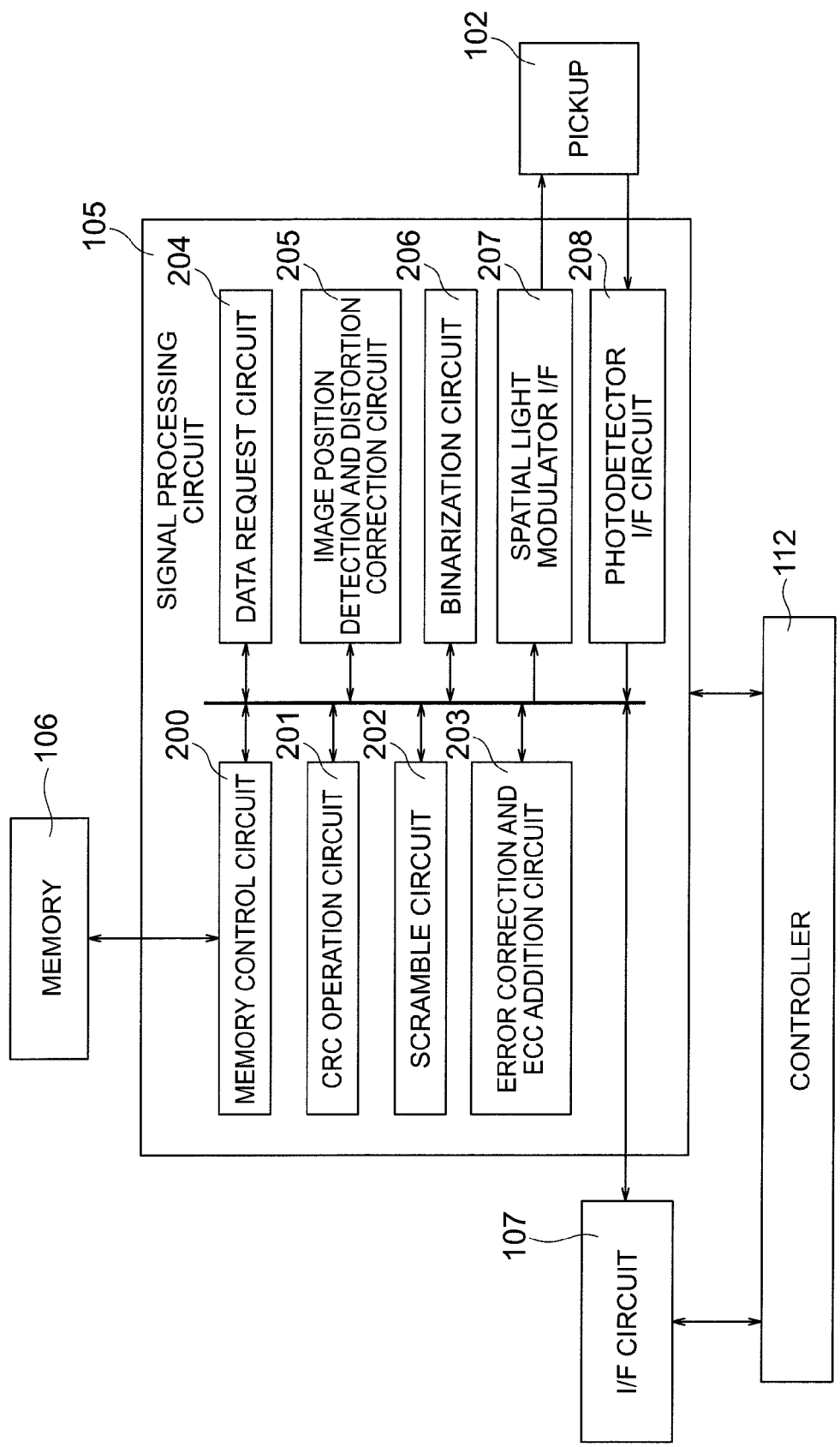
FIG. 2 is a block diagram showing a configuration of a signal processing circuit in the optical information recording and reproducing apparatus in the first embodiment.

FIG. 2 is a block diagram showing a configuration of the signal processing circuit in the optical information recording and reproducing apparatus in the first embodiment.

The signal processing circuit 105 is controlled by the controller 112. The signal processing circuit 105 stores data sent from the interface circuit 107 into the memory 106, conducts various kinds of signal processing on the memory, and sends resultant data to the pickup 102.

Or the signal processing circuit 105 stores image data sent from the pickup 102 into the memory 106, conducts various kinds of signal processing on the memory, extracts data, and sends the extracted data to the interface circuit 107.

A memory control circuit 200 conducts data writing into/reading from the memory 106 in response to a data input/output request from each circuit.

A CRC operation circuit 201 operates a CRC of each data string on the memory 106 and adds the CRC to the data string. Or the CRC operation circuit 201 operates a CRC of each data string and detects an error.

A scramble circuit 202 conducts scrambling on data strings in the memory 106. Or the scramble circuit 202 descrambles the data strings.

An error correction and error correction code addition circuit 203 adds an error correction code on the memory 106. Or the error correction and error correction code (ECC) addition circuit 203 corrects an error included in data which is stored in the memory 106.

A data request circuit 204 requests the host computer via the interface circuit 107 to retransfer data when a verify error has occurred.

An image position detection and distortion correction circuit 205 exercises control to detect markers from image data stored in the memory 106 and extract an effective data range, corrects image distortions such as the inclination, magnification and distortion, and converts image data to an expected size of two-dimensional data.

A binarization circuit 206 binarizes each bit data of a plurality of bits which constitute the two-dimensional data subjected to the size conversion, to "0" or "1," and stores data into the memory 106 in order of the output reproduced data.

A spatial light modulator interface circuit 207 reads out data with an error correction code added from the memory 106 in the row order of the two-dimensional data, adds markers which become reference at the time of reproducing, and then outputs the two-dimensional data to the spatial light modulator in the pickup 102.

Image data from the photodetector in the pickup 102 is input to a photodetector interface circuit 208. The photodetector interface circuit 208 writes the image data into the memory 106.

Although not illustrated, respective circuits are controlled by the controller 112. Or a dedicated controller may be provided in the signal processing circuit 105 to control the respective circuits.

Operation of the signal processing circuit 105 conducted when recording data on the optical information recording media 101 will now be described.

The signal processing circuit 105 stores data, which is sent from the interface circuit 107, into the memory 106 via the memory control circuit 200, divides the data into a plurality of data strings, adds an address to each data string, adds a CRC (Cyclic Redundancy Check) to each data string by using the CRC operation circuit 201 to make possible error detection at the time of reproducing, makes the number of on-pixels nearly equal to the number of off-pixels, conducts scrambling of adding a pseudo random number data string to each data string by using the scramble circuit 202 with the object of preventing repetition of the same pattern, and then adds an error correction code such as the Reed-Solomon code by using the error correction and error correction code addition circuit 203 to make possible error correction at the time of reproducing. And the signal processing circuit 105 converts the data string to M by N two-dimensional data by using the memory control circuit 200, repeats the conversion by a number of times corresponding to one page data, and thereby constitutes two-dimensional data corresponding to one page. The signal processing circuit 105 adds markers, which become reference in image position detection and image distortion correction at the time of reproducing, to the two-dimensional data constituted in this way by using the spatial light modulator interface circuit 207, and sends resultant data to the spatial light modulator in the pickup 102.

When conducting verify processing, the signal processing circuit 105 receives the detected image data from the photodetector in the pickup 102 by using the photodetector interface circuit 208, stores the detected image data into the memory 106 via the memory control circuit 200, detects the markers included in the image data and detects the effective data range by using the image position detection and distortion correction circuit 205, corrects image distortions such as the inclination, magnification and distortion by using the detected markers, and converts image data to an expected size of two-dimensional data. And the signal processing circuit 105 binarizes each bit data of a plurality of bits which constitute the two-dimensional data subjected to the size conversion by using the binarization circuit 206, and exercises control to store data into the memory 106 in order of the output reproduced data. The signal processing circuit 105 conducts error correction processing on the data string obtained in this way by using the error correction and error correction code addition circuit 203, conducts descrambling by using the scramble circuit 202, and conducts error detection processing by using the CRC operation circuit 201.

If an error is detected in the error correction processing, the CRC operation processing, or the like, then the signal processing circuit 105 requests the host computer 108 via the interface circuit 107 to retransfer data by using the data request circuit 204.

Operation of the signal processing circuit 105 conducted when reproducing data from the optical information recoding media 101 will now be described.

The signal processing circuit 105 receives detected image data from the photodetector in the pickup 102 by using the photodetector interface circuit 208, stores the detected image data into the memory 106 via the memory control circuit 200, detects markers included in the image data and extracts an effective data range by using the image position detection and distortion correction circuit 205, corrects image distortions such as the inclination, magnification and distortion by using the detected markers, and converts image data to an expected size of two-dimensional data. And the signal processing circuit 105 binarizes each bit data of a plurality of bits which constitute the two-dimensional data subjected to the size conversion by using the binarization circuit 206, and exercises control to store data into the memory 106 in order of the output reproduced data. The signal processing circuit 105 conducts error correction processing on the data string obtained in this way by using the error correction and error correction code addition circuit 203, conducts descrambling by using the scramble circuit 202, conducts error detection processing by using the CRC operation circuit 201, and sends resultant data string to the interface circuit 107.

Figure 3:
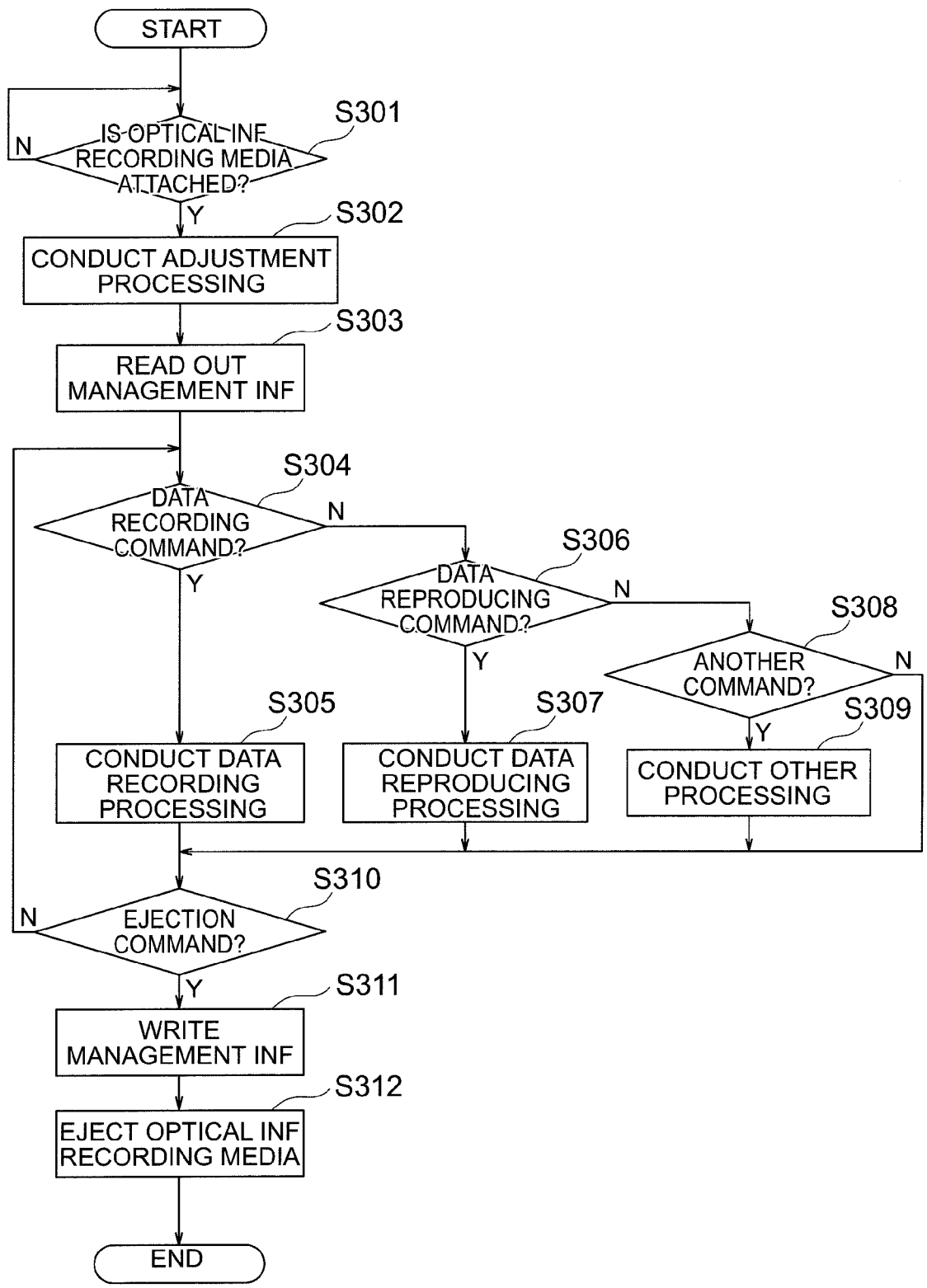
FIG. 3 is a flow chart for explaining operation of the optical information recording and reproducing apparatus in the first embodiment.

FIG. 3 is a flow chart showing operation of the optical information recording and reproducing apparatus in the first embodiment.

Upon attachment of the optical information recording media to the optical information recording and reproducing apparatus at step S301, adjustment processing is conducted at step S302 and management information is read out at step S303.

Upon receiving a data recording command from the host computer at step S304, data recording processing is conducted at step S305. Or upon receiving a data reproducing command from the host computer at step S306, data reproducing processing is conducted at step S307. Or upon receiving another command from the host computer at step S308, other processing is conducted at step S309.

Upon receiving an ejection command of the optical information recording media at step S310, management information is written onto the optical information recording media at step S311. Alternation information is included in the management information. If there is data alternated due to a defect, a verify error or the like, alternation information is written there.

Then, the optical information recording media is ejected at step S312, and the processing is finished.

By the way, timing of writing the management information is not especially restricted to the above-described timing, but an interval in recording of the cure unit or timing of an order given by the host computer 108 is also conceivable.

Figure 4:
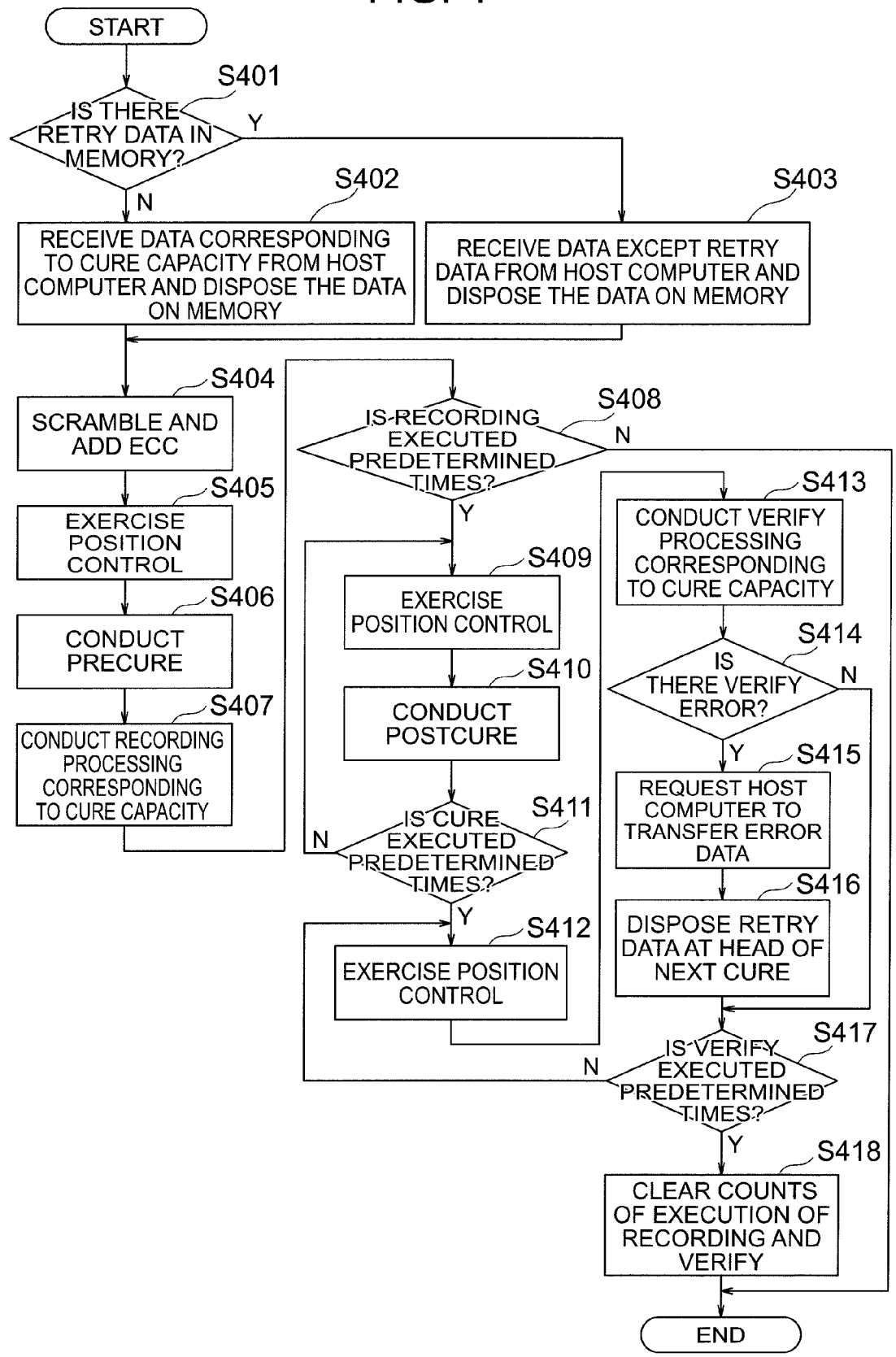
FIG. 4 is a flow chart for explaining operation of data recording processing in the optical information recording and reproducing apparatus in the first embodiment.

FIG. 4 is a flow chart showing operation of data recording processing in the optical information recording and reproducing apparatus in the first embodiment.

The data recording command from the host computer is issued by the host computer every predetermined recording unit constituting a book, every book unit constituting a cure, or every cure capacity. Upon receiving data corresponding to a first cure unit from the host computer, a decision is made at step S401 whether there is retry data (described later) in the memory. At the time when data corresponding to the first cure unit is received, verify processing is not yet executed and consequently there are no retry data. At step S402, therefore, data corresponding to the cure capacity is received in succession from the host computer and disposed on the memory. When arranging the received data on the memory, the data is divided into a plurality of data strings and an error detection code CRC is added to each data string to make possible error detection at the time of reproducing.

Then, at step S404, the number of on-pixels is made nearly equal to the number of off-pixels, scrambling of adding a pseudo random number data string to each data string is conducted with the object of preventing repetition of the same pattern, and then an error correction code such as the Reed-Solomon code is added to make possible error correction at the time of reproducing.

Then, at step S405, rotation control of the motor and position control of the pickup and the cure optical system are conducted and movement to a desired position is conducted in order to record data in a desired position of the optical information recording media.

Then, at step S406, precure is conducted. At step S407, data corresponding to the cure capacity is recorded onto the optical information recording media. For example, supposing that there are 100 books in one cure and there are 300 pages in one book, 300 pages are recorded by angular multiplexing in a head book in the cure, 300 pages are recorded in the next book in the same way, and this is conducted for 100 books to record data in all books in the cure.

Then, at step S408, a decision is made whether recording processing at the step S407 is executed a predetermined number of times. If the recording processing is executed a predetermined number of times, postcure processing (described later) and verify processing are conducted a predetermined number of times at steps S409 to S415. In the first processing of the data recording command, however, the recording processing is not executed a predetermined number of times, and consequently the processing is finished. For example, the predetermined number of times is set equal to two here, and after recording processing is conducted twice, verify processing is conducted twice. This means that the postcure processing and verify processing at the steps S409 to S415 are not executed immediately after recording processing at the step S407 is conducted at the Nth time, but the postcure processing and verify processing at the steps S409 to S415 at the Nth time and the postcure processing and verify processing at the steps S409 to S415 at the (N+1)-st time are conducted after the recording processing at the step S407 at the (N+1)-st time is conducted.

In general, there are the photochemical reaction which is a reaction during irradiation with a light beam and the nonphotochemical reaction which is a reaction after irradiation with the light beam in the hologram recording. It is necessary to wait for end of the nonphotochemical reaction before executing the postcure and verify processing after recording processing. It is possible to prevent the data transfer rate from being lowered due to a time period for waiting the end of the nonphotochemical reaction, by suitably setting the predetermined number of times and conducting the recording processing and the verify processing efficiently.

Upon receiving a data recording command at the second time from the host computer, the processing at the steps S401 to S407 is executed again.

At the step S401, a decision is made whether there is retry data in the memory. At this time as well, the verify processing is not yet executed, and there is no retry data. At the step S402, therefore, data corresponding to the cure capacity is received from the host computer and disposed on the memory.

Then, at the step S404, scrambling is conducted and then an error correction code (ECC) is added.

Then, at the step S405, rotation control of the motor and position control of the pickup and the cure optical system are conducted and movement to a desired position is conducted in order to record data in a desired position of the optical information recording media. Here, the desired position is, for example, neighboring the immediately recorded cure. Typically, the recording position is moved in order in the circumference direction or the radial direction.

Then, at the step S406, precure is conducted. At the step S407, data corresponding to the cure capacity is recorded onto the optical information recording media.

Then, at the step S408, a decision is made whether recording processing is executed the predetermined number of times. At this time, the recording processing is executed the predetermined number of times, and consequently postcure is conducted a predetermined number of times at steps S409 to S411.

First, at the step S409, rotation control of the motor and position control of the cure optical system are conducted and movement to a desired position is conducted in order to conduct postcure in a desired position of the optical information recording media. Here, the desired position is the position where data was recorded at the steps S401 to S407.

Then, at step S410, postcure is conducted. At step S411, a decision is made whether postcure is executed a predetermined number of times.

If postcure is executed on recorded data corresponding to two cure capacities, then at step S412 rotation control of the motor and position control of the pickup are conducted and movement to a desired position is conducted in order to verify data in a desired position of the optical information recording media.

Here, the desired position is the position where data was recorded at the steps S401 to S407 and the position where the postcure was executed at the steps S409 to 411.

Then, at step S413, verify processing of data corresponding to the cure capacity is conducted. As for the verify processing, a result is regarded as a verify error if an error correction impossibility or a CRC error has occurred by reproducing data from the optical information recording media. Or if a predetermined number of errors is exceeded even if an error correction impossibility does not occur, the result is regarded as a verify error. Or if non-coincidence occurs in comparison between data reproduced from the optical information recording media and the original data on the memory, the result is regarded as a verify error. Data corresponding to the cure capacity is reproduced from the optical information recording media.

Then, at step S414, a decision is made whether a verify error has occurred. If recorded data has caused a verify error, the host computer is requested to retransfer data which has caused an error, at step S415. At step S416, retry data sent from the host computer is disposed at the head of the next cure capacity unit secured in the memory to be recorded onto the optical information recording media.

Then, at step S417, a decision is made whether verify processing has been executed a predetermined number of times. In the verify processing at the first time, the verify processing has not been executed the predetermined number of times. Therefore, returning to the step S412, the processing at the steps S412 to S417 is executed.

Upon executing the verify processing the predetermined number of times, the numbers of times of execution of recording and verify processing are cleared at step S418 and the processing is finished.

Upon receiving the data recording command at the third time, the processing at the steps S401 to S407 is executed again.

At the step S401, a decision is made whether there is retry data in the memory. If there is retry data in the memory, i.e., if retry data is disposed at the head in the memory at the step S416 due to occurrence of a verify error, data corresponding to a difference obtained by subtracting the capacity corresponding to the retry data from the cure capacity is received and disposed on the memory at step S403.

Then, at the step S404, scrambling is conducted and then an error correction code (ECC) is added.

Then, at the step S405, rotation control of the motor and position control of the pickup and the cure optical system are conducted and movement to a desired position is conducted in order to record data in a desired position of the optical information recording media.

Then, at the step S406, precure is conducted. At the step S407, data corresponding to the cure capacity is recorded onto the optical information recording media.

Then, at the step S408, a decision is made whether recording processing is executed the predetermined number of times. As described above, the numbers of times of execution of recording and verify processing have been cleared at the step S418. At this time, therefore, the predetermined number of times is not reached, and the processing is finished.

Upon receiving the data recording command at the fourth time, the processing at the steps S401 to S407 is executed again.

Then, at the step S408, a decision is made whether recording processing is executed the predetermined number of times. At this time, the recording processing is executed the predetermined number of times, and consequently postcure is conducted a predetermined number of times at steps S409 to S411. At steps S412 to S417, verify processing is conducted the predetermined number of times. At step S418, the numbers of times of execution of recording and verify processing are cleared.

If the predetermined number of times is set equal to two, recording processing is conducted twice and then verify processing is conducted twice and data are recorded onto the optical information recording media by repeating this.

Data which has generated a verify error once is re-recorded as retry data, and a defect origin address and an alternating address are registered in the management information as alternation information. If the retry data has also caused a verify error, retry processing is conducted again.

Figure 5:
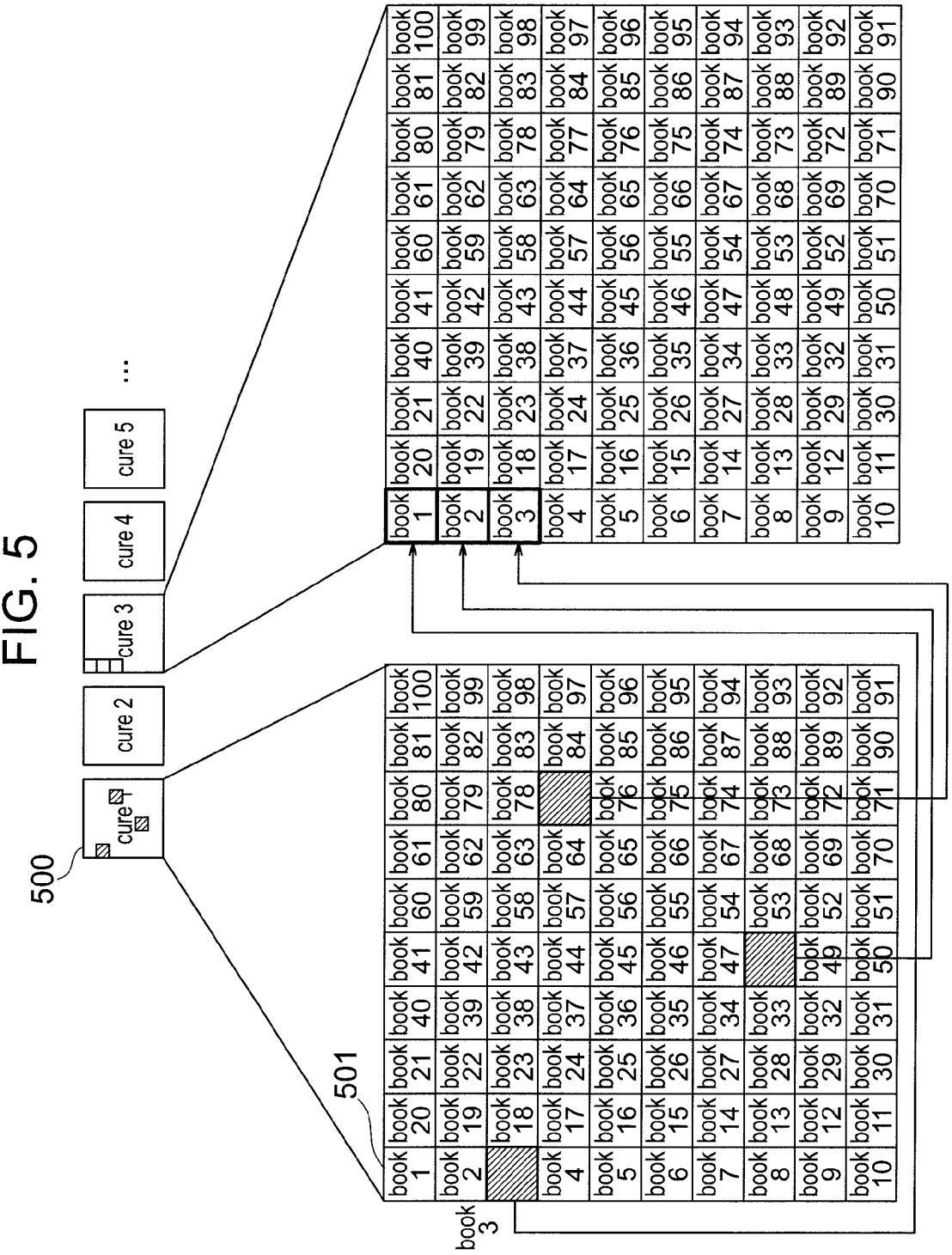
FIG. 5 is a diagram for explaining cures and books on information recording media in the first embodiment.

FIG. 5 is a diagram for explaining cures and books on the information recording media.

A cure 500 represents an area where precure and postcure are conducted once. A book 501 represents an area where recording and reproducing are conducted. Data are recorded in order in the rotation direction and radial direction on the information recording media by using a cure as the unit.

At the time of data recording, precure is first conducted by taking a cure as the unit. Then, data are recorded in order by taking a book in each cure as the unit. For example, supposing that there are 100 books in each cure and there are 300 pages in each book, 300 pages are recorded in a certain book in a cure by angular multiplexing, 300 pages are recorded in the next book in the same way, and data are recorded in all books in the cure by conducting this for 100 books. Then, postcure is conducted, and verify processing of data in the cure is conducted. By the way, data include at least an address.

For example, precure is conducted on a cure 1, and data are recorded in book 1 to book 100 in the cure 1. Precure is conducted on a cure 2, and data are recorded in book 1 to book 100 in the cure 2. Then, postcure is conducted on the cure 1 and cure 2, and verify processing is conducted. It is now supposed that data recorded in books 3, 48 and 77 in the cure 1 cause verify errors when the verify processing is conducted.

In this case, the data recorded in the books 3, 48 and 77 in the cure 1 are re-recorded in books 1, 2 and 3 in a cure 3.

And addresses of the books 3, 48 and 77 in the cure 1 are registered in the management information as defect source addresses, and addresses of the books 1, 2 and 3 in the cure 3 are registered in the management information as alternating addresses. If data in the books 1, 2 and 3 in the cure 3 have caused verify errors, the data are re-recorded in the books 1, 2 and 3 in a cure 5, and their addresses are registered as alternating addresses.

Figure 6:
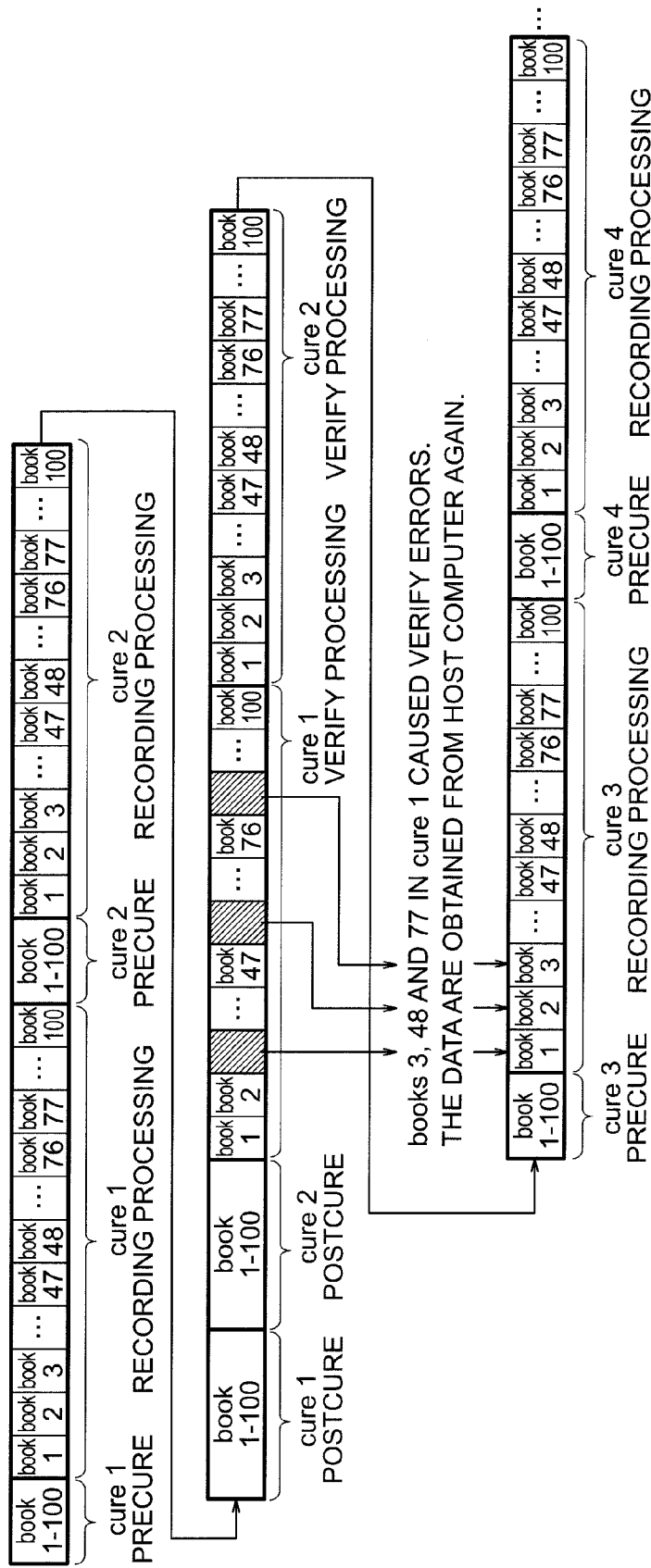
FIG. 6 is a timing chart showing operations of data recording processing and verify processing in the optical information recording and reproducing apparatus in the first embodiment.

FIG. 6 is a timing chart showing operations of data recording processing and verify processing in the optical information recording and reproducing apparatus.

Precure is conducted on the cure 1, and recording processing is conducted in order on book 1 to book 100 in the cure 1. Precure is conducted on the cure 2, and recording processing is conducted in order on book 1 to book 100 in the cure 2. Postcure is conducted on the cure 1 and cure 2, and then verify processing is conducted. The case where data recorded in books 3, 48 and 77 in the cure 1 cause verify errors is shown.

Then, position control is exercised. Precure is conducted on the cure 3. When recording is conducted in order on book 1 to book 100 in the cure 3, data recorded in the book 3 in the cure 1 is re-recorded in the book 1 in the cure 3.

Furthermore, data recorded in the books 48 and 77 in the cure 1 are re-recorded in books 2 and 3 in the cure 3.

Data to be recorded in the books 1, 2 and 3 unless verify errors do not occur are recorded in books 4, 5 and 6. Thereafter, all data are recorded with a shift backward.

And addresses of the books 3, 48 and 77 in the cure 1 are registered in the management information as defect source addresses, and addresses of the books 1, 2 and 3 in the cure 3 are registered in the management information as alternating addresses.

Figure 7:
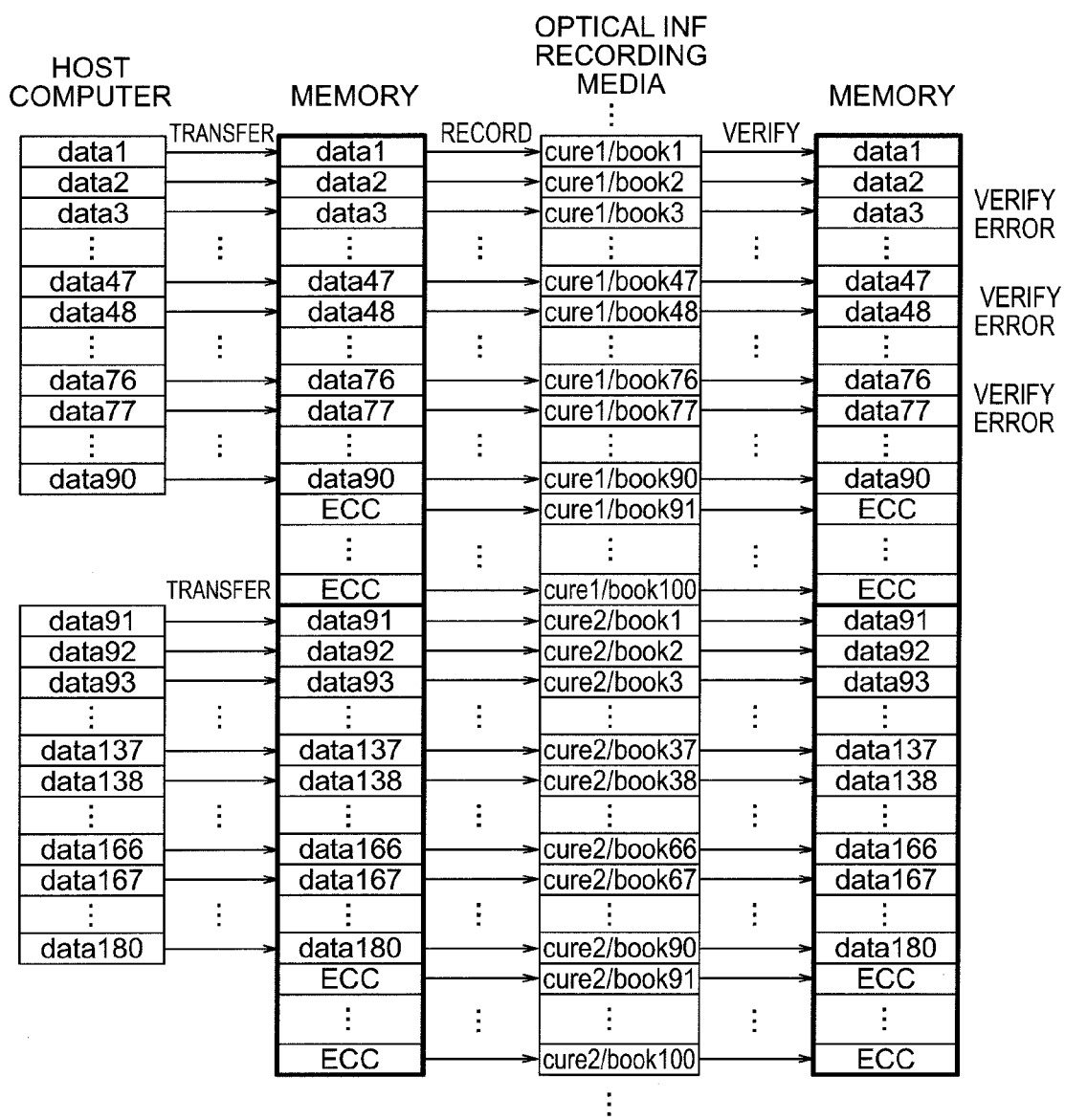
FIG. 7 is a diagram showing correspondence between data and books in the optical information recording and reproducing apparatus in the first embodiment.
Figure 8:
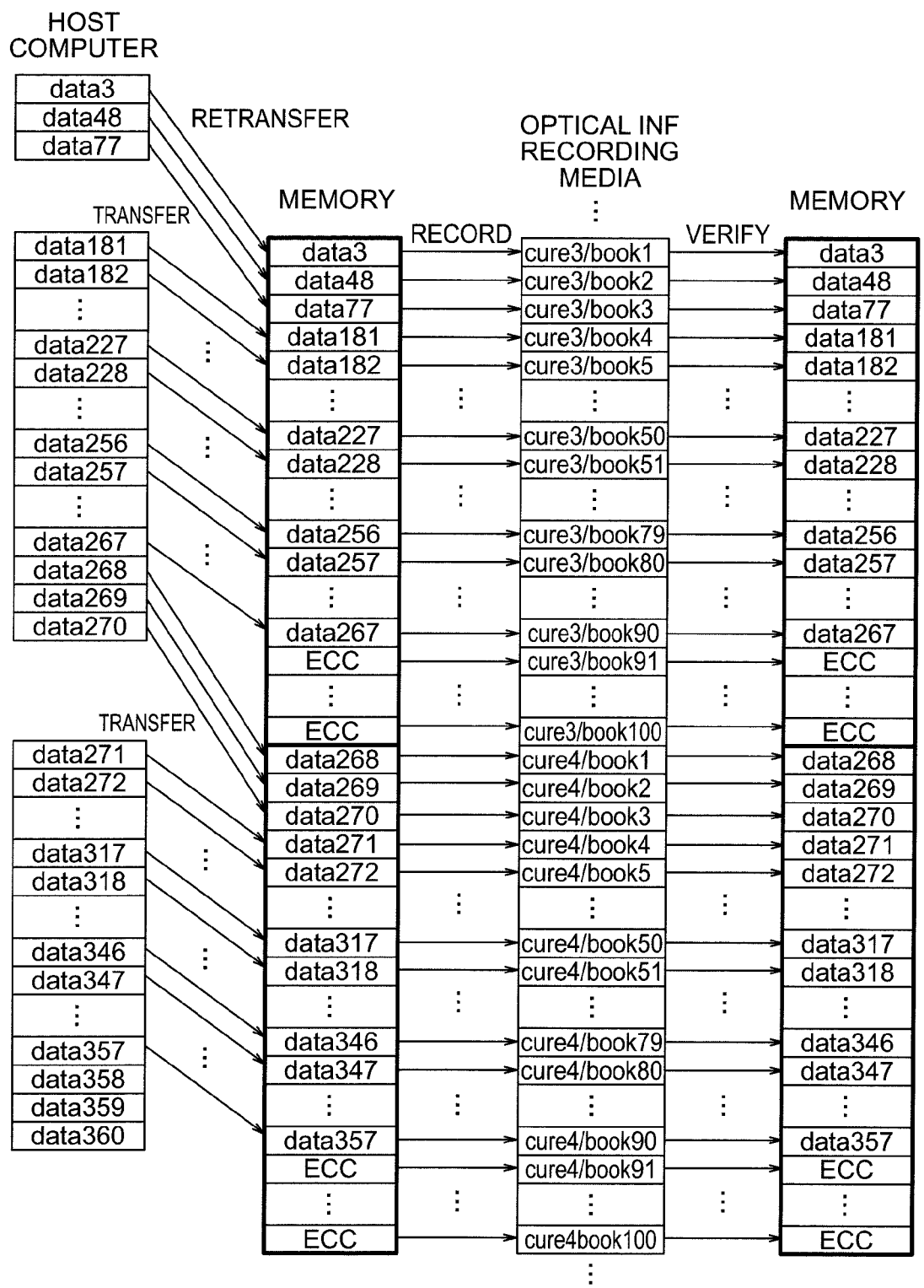
FIG. 8 is a diagram showing correspondence between data and books in the optical information recording and reproducing apparatus in the first embodiment.

FIGS. 7 and 8 are diagrams showing correspondence between data and books at the time when the optical information recording and reproducing apparatus in the first embodiment receives data from the host computer, stores the data into the memory, records the data on the information recording media, and conducts verify processing.

FIG. 7 shows an example in which the optical information recording and reproducing apparatus receives data 1 to 180 from the host computer and records the data 1 to 180 in the cure 1 and cure 2 on the optical information recording media.

First, the optical information recording and reproducing apparatus receives data 1 to 90 from the host computer, stores the data 1 to 90 into the memory temporarily, and adds error correction codes ECC. In the same way, the optical information recording and reproducing apparatus receives data 91 to 180, stores the data 91 to 180 into the memory temporarily, and adds error correction codes ECC.

Then, the optical information recording and reproducing apparatus records the data 1 to 90 and the error correction codes ECC into books 1 to 100 in the cure 1 on the optical information recording media. In the same way, the optical information recording and reproducing apparatus records the data 91 to 180 and the error correction codes ECC into books 1 to 100 in the cure 2 on the optical information recording media.

Then, the optical information recording and reproducing apparatus reproduces the data in the books 1 to 100 in the cure 1 on the optical information recording media, stores the reproduced data into the memory, and conducts error correction. An example in which data 3, 48 and 77 have caused verify errors is shown. In the same way, the optical information recording and reproducing apparatus reproduces the data in the books 1 to 100 in the cure 2, stores the reproduced data into the memory, and conducts error correction.

FIG. 8 shows an example in which the optical information recording and reproducing apparatus receives the data 3, 48, and 77, and data 181 to 357 from the host computer and records the data into the cure 3 and cure 4 on the optical information recording media.

First, the optical information recording and reproducing apparatus requests the host computer to retransfer the data 3, 48 and 77, and stores received data into the memory temporarily. In addition, the optical information recording and reproducing apparatus receives data 181 to 267 from the host computer, stores the data into the memory temporarily, and adds error correction codes ECC. In the same way, the optical information recording and reproducing apparatus receives data 268 to 357, stores the data into the memory temporarily, and adds error correction codes ECC.

Then, the optical information recording and reproducing apparatus records the data 3, 48, and 77, the data 181 to 267, and the error correction codes ECC into books 1 to 100 in the cure 3 on the optical information recording media. In the same way, the optical information recording and reproducing apparatus records the data 268 to 357 and the error correction codes ECC into books 1 to 100 in the cure 4 on the optical information recording media.

Then, the optical information recording and reproducing apparatus reproduces the data in the books 1 to 100 in the cure 3 on the optical information recording media, stores the reproduced data into the memory, and conducts error correction. The books 1 to 3 in the cure 3 store the data 3, 48 and 77 in the cure 1. Addresses of the data 3, 48 and 77 are registered in the management information as defect source addresses. Addresses of the books 1 to 3 in the cure 3 are registered in the management information as alternating addresses. If data in the books 1 to 3 in the cure 3 have caused verify errors, the data are re-recorded in the books 1 to 3 in a cure 5.

In FIGS. 7 and 8, description of the precure, the postcure, the scrambling, and the CRC processing has been omitted.

Data 358 to 360 are recorded in the cure 5.

In the present embodiment, an example in which data are alternated by taking a book as the unit is shown for intelligibility. However, it is not necessary that data are alternated especially by taking a book as the unit.

In the present embodiment, an example in which error correction codes are added by taking a cure as the unit is shown for intelligibility. However, it is not necessary that error correction codes are added especially by taking a cure as the unit.

In the present embodiment, an example in which the optical information recording and reproducing apparatus conducts error correction processing and retry data generation is shown. Alternatively, however, the host computer may conduct the error correction processing and retry data generation.

In the present embodiment, an example in which recording processing of data corresponding to the cure capacity received from the host computer is conducted and then the next cure is received is shown. However, the next data corresponding to the cure capacity may be received while the recording processing is being conducted. Or after data corresponding to a plurality of cure capacities are received, recording processing may be started.

In the first embodiment of the present invention, data are recorded in order on the optical information recording media and verify processing on the recorded data is conducted in order, by using the configuration described heretofore. If recorded data has caused a verify error, the host computer is requested to retransfer the data. Received data is disposed at the head of the next cure capacity unit secured in the memory to be recorded onto the optical information recording media, and recorded. If data in a cure capacity is constituted by data formed of only verify errors at the end of all recording processing, most of the cure capacity is not used and a large unrecorded area is left in some cases. In this case, the cure recording unit is brought into a state in which incremental recording is impossible. Even in such a case, however, data which have resulted in verify errors are intruded at the head of the next cure capacity unit to be recorded and recorded. As a result, only a required minimum area is used, and it is possible to hold down the consumption of the recording area on the optical information recording media.

In the present embodiment, data which has caused a verify error is re-obtained from the host computer. Therefore, it is not necessary to retain the original data until completion of verify processing. The optical information recording and reproducing apparatus can be constituted by mounting a memory having a required minimum capacity.

According to the present embodiment, the cure unit where the retry data exists and the cure unit where data having a detected verify error exists are located at a short distance between. As a result, performance of access to the retry data is improved.

In the present embodiment, an example in which data which has resulted in a verify error is intruded at the head of the next cure unit to be recorded has been described. However, the present invention is not restricted to this. For example, the data which has caused a verify error may be intruded at the end of the next cure unit to be recorded, and recorded. Or the data which has caused a verify error may be intruded elsewhere.

Embodiment 2

Figure 9:
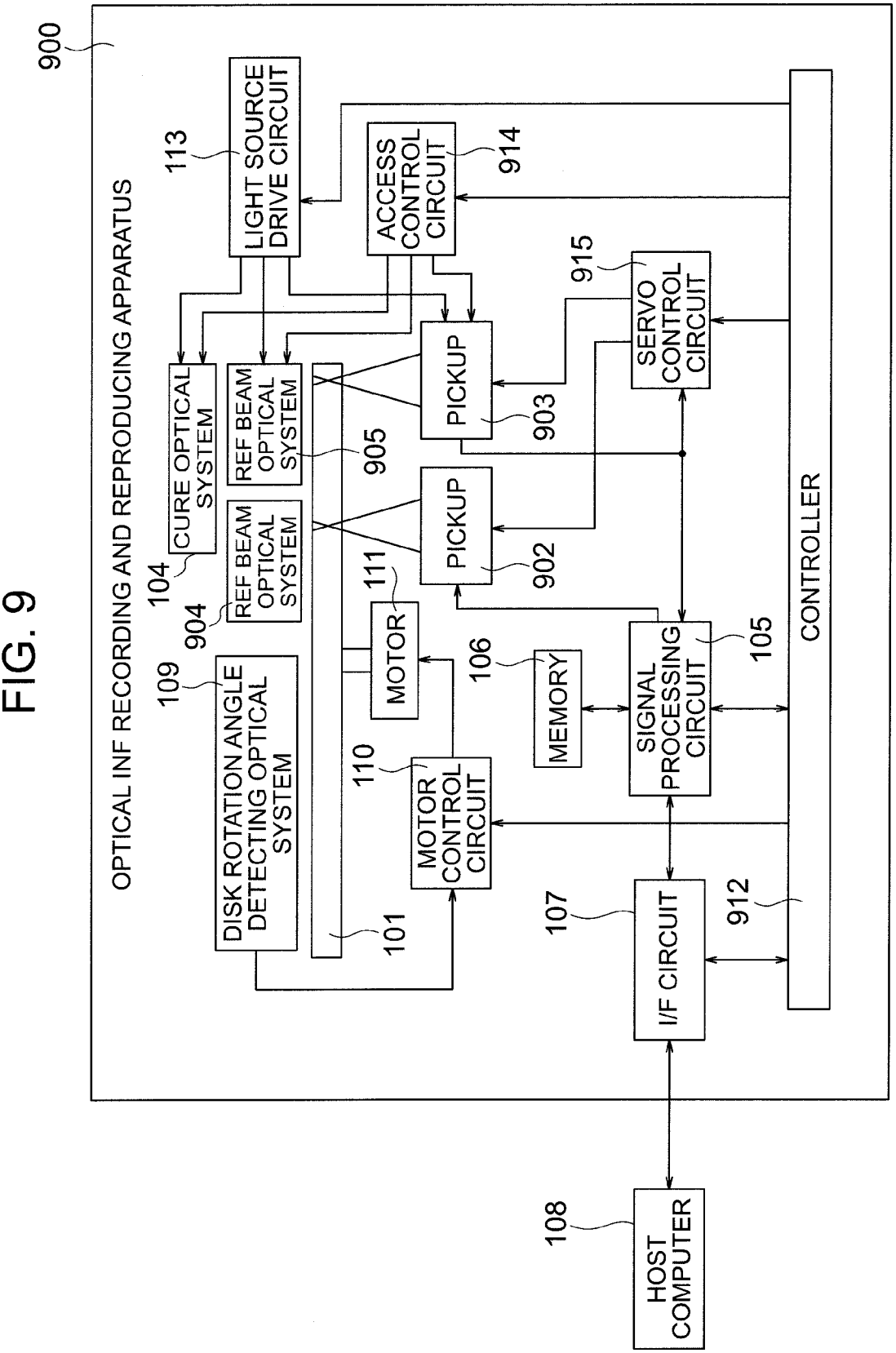
FIG. 9 is a block diagram showing a configuration of an optical information recording and reproducing apparatus in a second embodiment.

FIG. 9 is a block diagram showing a configuration of an optical information recording and reproducing apparatus in a second embodiment. Description of parts common to those in FIG. 1 will be omitted.

An optical information recording and reproducing apparatus 900 is connected to the host computer 108. The optical information recording and reproducing apparatus 900 records data input from the host computer 108, onto the optical information recording media 101. Furthermore, the optical information recording and reproducing apparatus 900 outputs data, which is reproduced from the optical information recording media 101, to the host computer 108. Since pickups 902 and 903 are configured to be movable in the radial direction, information recording and reproducing can be conducted over the whole face of the optical information recording and reproducing media 101 by using holography.

For recording information, it is necessary to irradiate the optical information recording media 101 with a signal beam and a reference beam. The pickup 902 irradiates the optical information recording media 101 with the signal beam. A reference (REF) beam optical system 904 irradiates the optical information recording media 101 with the reference beam.

For reproducing information from holography, it is necessary to irradiate the optical information recording media 101 with a reference beam and detect a reproduced beam. A reference beam optical system 905 irradiates the optical information recording media 101 with the reference beam. The pickup 903 detects a reproduced beam reproduced at that time by using a photodetector in the pickup 903, and sends a result of the detection to the signal processing circuit 105.

In addition, each of the pickups 902 and 903 detects a deviation quantity of the reference beam angle by using a mechanism for detecting the deviation quantity, and sends the deviation quantity to a servo control circuit 915.

Operation of the optical information recording and reproducing apparatus 900 conducted when recording data on the optical information recording media 101 will now be described. Upon attachment of the optical information recording media 101 to the optical information recording and reproducing apparatus 100, a controller 912 conducts adjustment processing of the respective units, moves the pickup 902 and the reference beam optical system 904 respectively to predetermined positions by using the motor control circuit 110 and an access control circuit 914, reads out management information from the optical information recording media 101 via the pickup 902 and the signal processing circuit 105, and stores the management information into the memory 106.

And the controller 912 moves the pickup 902, the reference beam optical system 904 and the cure optical system 104 to their respective desired positions, by using the motor control circuit 110 and the access control circuit 914.

Upon sending of data from the host computer 108 to the optical information recording and reproducing apparatus 900, the controller 912 receives the data by using the interface circuit 107, stores the data into the memory 106, and conducts CRC addition, scrambling and error correction code addition by using the signal processing circuit 105.

And the controller 912 moves the pickup 902 and the reference beam optical system 904 to their respective desired positions by using the motor control circuit 110 and the access control circuit 914. The controller 912 conducts precure by using the cure optical system 104. The controller 912 reads out data from the memory 106, adds markers to the data, sends resultant data to the pickup 902, and records the resultant data onto the optical information recording media 101, by using the signal processing circuit 105. And the controller 912 conducts the postcure by using the cure optical system 104.

When conducting verify processing, i.e., when ascertaining whether recorded data can be read out correctly, image data detected from the optical information recording media 101 by the pickup 903 is sent to the signal processing circuit 105, the image position is detected by using the markers as reference, and distortions are corrected. Then, binarization processing is conducted, and two-dimensional data is acquired and stored into the memory 106. And the two-dimensional data is converted to a plurality of data strings, then error correction processing is conducted, descrambling is conducted, and error detection processing using the CRC is conducted. If an error is detected here, the controller 912 is informed of a verify error and the controller 912 conducts retry by controlling respective units. At the time of the retry, data resulting in non-coincidence is recorded in a head position of the next cure unit to be recorded.

Or the signal processing circuit 105 compares data at the time of recording with data at the time of verify processing. Upon non-coincidence, the signal processing circuit 105 informs the controller 912 of a verify error.

And verify processing of the retried data is conducted. If retry data does not cause a verify error, a defect origin address and an alternating address are registered in management information as alternation information. If retry data also causes a verify error, retry processing is conducted again.

Operation of the optical information recording and reproducing apparatus 900 conducted when reproducing data from the optical information recording media 101 will now be described. Upon attachment of the optical information recording media 101 to the optical information recording and reproducing apparatus 900, the controller 912 conducts adjustment processing of the respective units, moves the pickup 903 and the reference (REF) beam optical system 905 to their respective predetermined positions by using the motor control circuit 110 and the access control circuit 914, reads out management information from the optical information recording media 101 via the pickup 903 and the signal processing circuit 105, and stores the management information into the memory 106.

And the controller 912 moves the pickup 903 and the reference beam optical system 905 to their respective desired positions by using the motor control circuit 110 and the access control circuit 914. The controller 912 writes data reproduced from the optical information recording media 101, into the memory 106. The controller 912 conducts error correction processing, descrambling, and error detection processing by using the signal processing circuit 105.

And the controller 912 reads out data from the memory 106, and sends the data to the host computer 108 via the interface circuit 107.

Figure 10:
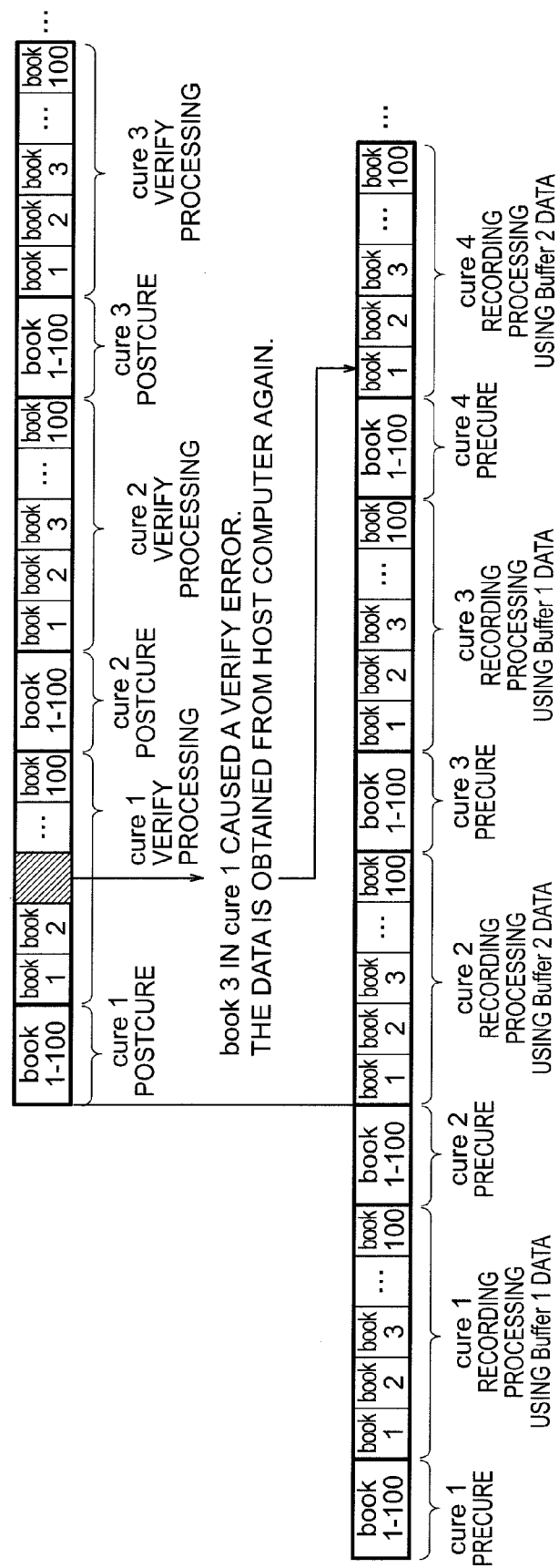
FIG. 10 is a timing chart showing operations of data recording processing and verify processing in the optical information recording and reproducing apparatus in the second embodiment.

FIG. 10 is a timing chart showing operations of data recording processing, verify processing, precure and postcure in the optical information recording and reproducing apparatus in the second embodiment.

It is supposed that the memory in the optical information recording and reproducing apparatus in the second embodiment has at least two storage planes, i.e., buffer 1 and buffer 2, and each of the buffer 1 and buffer 2 has a cure capacity.

First, precure is conducted on the cure 1, and data in the buffer 1 are recorded into book 1 to book 100 in the cure 1 in order.

Then, precure is conducted on the cure 2, and data in the buffer 2 are recorded into book 1 to book 100 in the cure 2 in order. In parallel with it, postcure is conducted on the cure 1 and then verify processing is conducted on the cure 1. It is supposed that as a result of the verify processing, data in book 3 in the cure 1 has caused a verify error.

Then, precure is conducted on the cure 3, and data in the buffer 1 updated with data for the cure 3 are recorded into book 1 to book 100 in the cure 3 in order. In parallel with it, postcure is conducted on the cure 2 and then verify processing is conducted on the cure 2. It is supposed that as a result of the verify processing, data in the cure 2 haven't caused any verify error.

Then, precure is conducted on the cure 4, and data in the buffer 2 updated with data for the cure 4 are recorded into book 1 to book 100 in the cure 4 in order. At this time, as for the book 1 in the cure 4, data recorded in book 3 in the cure 1 is re-obtained from the host computer and recorded into the book 1 in the cure 4.

Data to be originally recorded in the book 1 in the cure 4 unless the verify errors do not occur is recorded in book 2 in the cure 4. Thereafter, all data are recorded with a shift backward.

And an address of the book 3 in the cure 1 is registered in the management information as a defect origin address, and an address of the book 1 in the cure 4 is registered in the management information as an alternating address.

In the present embodiment, an example in which data are alternated by taking a book as the unit is shown for intelligibility. However, it is not necessary that data are alternated especially by taking a book as the unit.

In the present embodiment, an example in which error correction codes are added by taking a cure as the unit is shown for intelligibility. However, it is not necessary that error correction codes are added especially by taking a cure as the unit.

In the present embodiment, an example in which the optical information recording and reproducing apparatus conducts error correction processing and retry data generation is shown. Alternatively, however, the host computer may conduct the error correction processing and retry data generation.

Owing to the configuration described heretofore, effects similar to those in the first embodiment can be obtained in the second embodiment according to the present invention.

In addition, since the recording processing and the verify processing can be executed simultaneously, data can be recorded in a shorter time as compared with the first embodiment.

Embodiment 3

Figure 11:
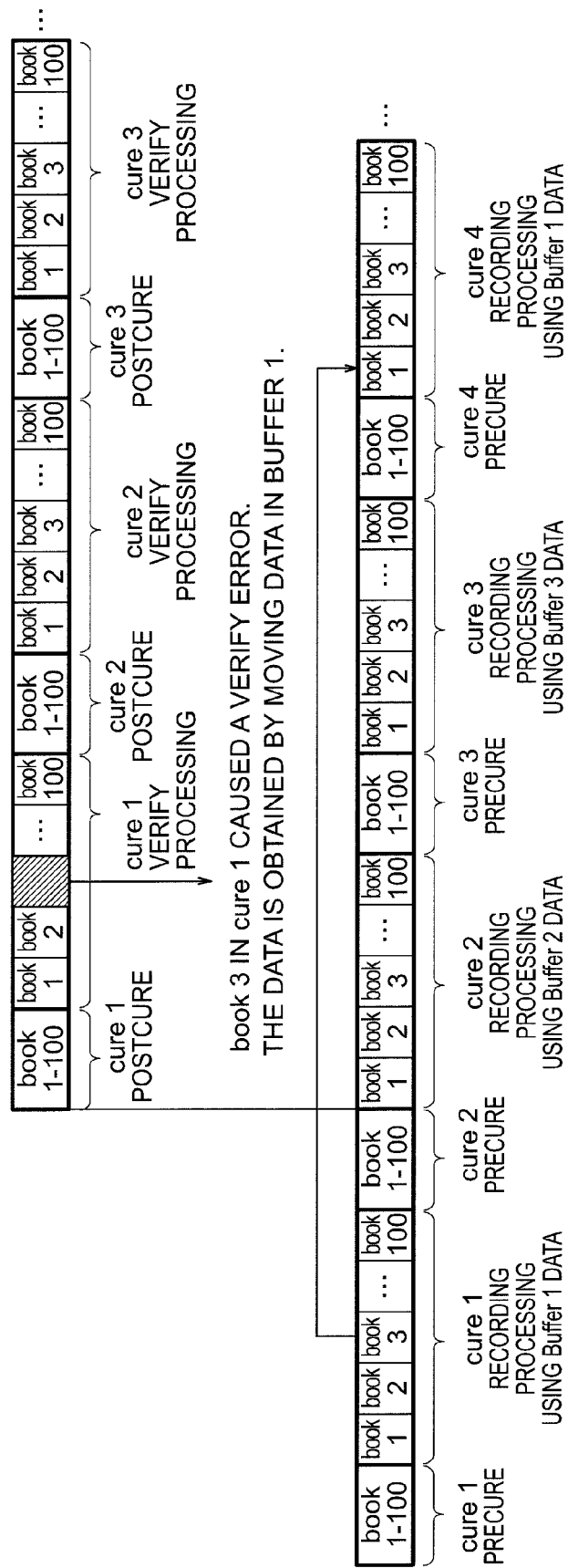
FIG. 11 is a timing chart showing operations of data recording processing and verify processing in an optical information recording and reproducing apparatus in a third embodiment.

FIG. 11 is a timing chart showing operations of data recording processing and verify processing in the optical information recording and reproducing apparatus in a third embodiment. Since a configuration of the optical information recording and reproducing apparatus is similar to that in the second embodiment, its description will be omitted. However, it is supposed that the memory in the optical information recording and reproducing apparatus in the third embodiment has at least three storage planes, i.e., buffer 1, buffer 2 and buffer 3, and each of the buffer 1, buffer 2 and buffer 3 has a cure capacity.

First, precure is conducted on the cure 1, and data in the buffer 1 are recorded into book 1 to book 100 in the cure 1 in order.

Then, precure is conducted on the cure 2, and data in the buffer 2 updated with data for the cure 2 are recorded into book 1 to book 100 in the cure 2 in order. In parallel with it, postcure is conducted on the cure 1 and then verify processing is conducted on the cure 1. It is supposed that as a result of the verify processing, data in book 3 in the cure 1 has caused a verify error.

Then, precure is conducted on the cure 3, and data in the buffer 3 updated with data for the cure 3 are recorded into book 1 to book 100 in the cure 3 in order. In parallel with it, postcure is conducted on the cure 2 and then verify processing is conducted on the cure 2. It is supposed that as a result of the verify processing, data in the cure 2 haven't caused any verify error.

Then, precure is conducted on the cure 4, and data in the buffer 2 updated with data for the cure 4 are recorded into book 1 to book 100 in the cure 4 in order. At this time, as for the book 1 in the cure 4, data recorded in book 3 in the cure 1 existing in the buffer 1 is disposed in a location in the memory corresponding to the location of book 1 in the cure 4. Data obtained newly from the host computer are recorded in book 2 and subsequent locations in the cure 4.

And an address of the book 3 in the cure 1 is registered in the management information as a defect origin address, and an address of the book 1 in the cure 4 is registered in the management information as an alternating address.

In the present embodiment, an example in which data are alternated by taking a book as the unit is shown for intelligibility. However, it is not necessary that data are alternated especially by taking a book as the unit.

In the present embodiment, an example in which error correction codes are added by taking a cure as the unit is shown for intelligibility. However, it is not necessary that error correction codes are added especially by taking a cure as the unit.

In the present embodiment, an example in which the optical information recording and reproducing apparatus conducts error correction processing and retry data generation is shown. Alternatively, however, the host computer may conduct the error correction processing and retry data generation.

Owing to the configuration described heretofore, effects similar to those in the second embodiment can be obtained in the third embodiment according to the present invention.

In addition, in the case where a verify error has occurred, it is possible to move data leaving in the memory and reuse the data as retry data. Unlike the second embodiment, therefore, it is not necessary to re-obtain data which has caused a verify error from the host computer.

Embodiment 4

Figure 12:
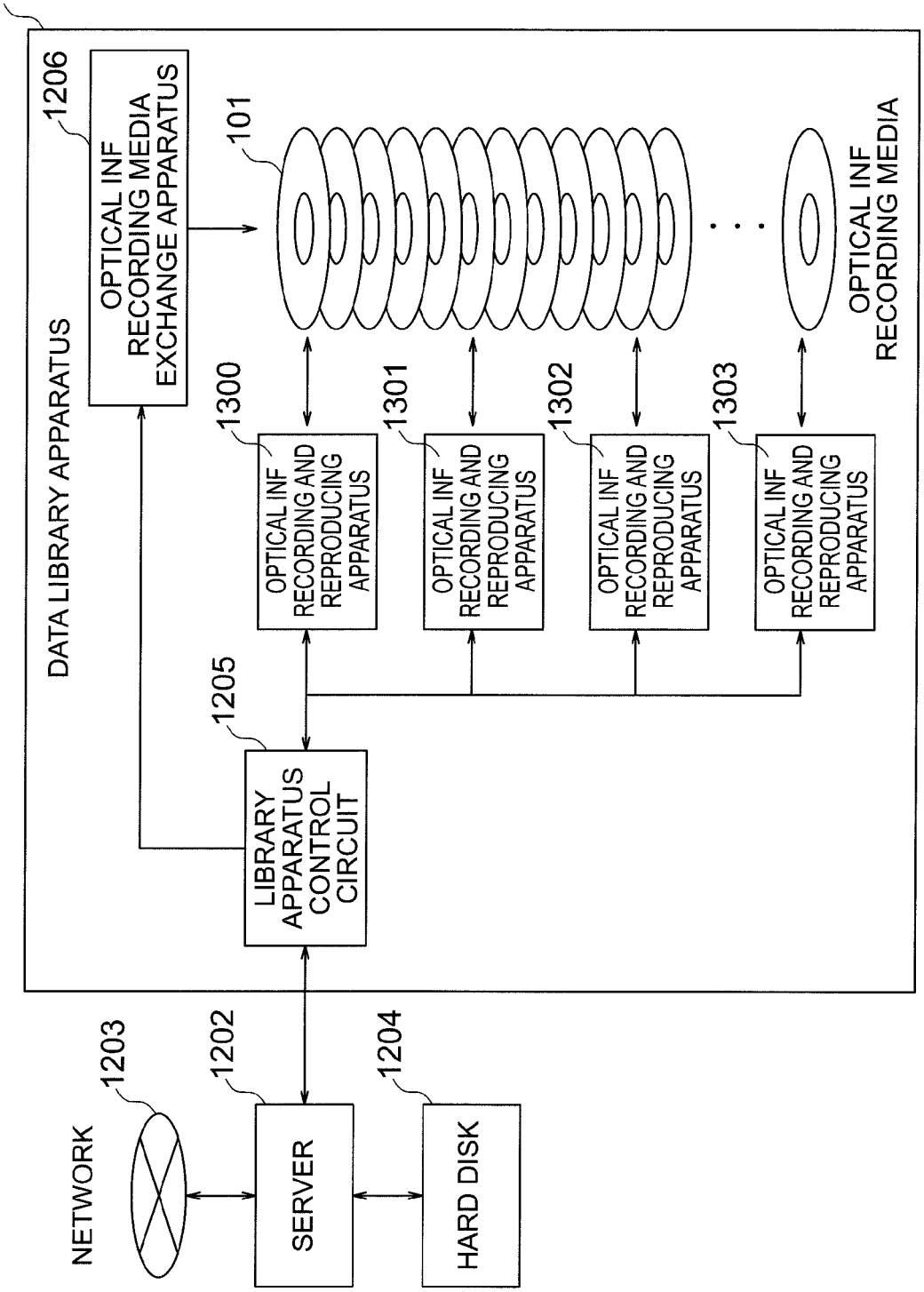
FIG. 12 is a block diagram showing a configuration of a data library apparatus in a fourth embodiment.

FIG. 12 is a block diagram showing a configuration of a data library apparatus in a fourth embodiment according to the present invention.

A data library apparatus 1201 records data accumulated on a hard disk 1204 from a network 1203 via a server 1202 onto optical information recording media. Or the data library apparatus 1201 reproduces data from optical information recording media and sends the data to the network 1203 via the server 1202. The server 1202 controls the hard disk 1204 and the data library apparatus 1201 and manages data sent from the network 1203. The hard disk 1204 is controlled by the server 1202 to conduct recording and reproducing data sent from the network 1203.

A plurality of optical information recording media 101 are stored in the data library apparatus 1201, selected by an optical information media exchange apparatus 1206, and attached to optical information recording and reproducing apparatuses 1300, 1301, 1302 and 1303 to record and reproduce data. The optical information recording and reproducing apparatuses 1300, 1301, 1302 and 1303 are controlled by a library apparatus control circuit 1205 to conduct data recording and reproducing on the optical information recording media 101. The optical information recording media exchange apparatus 1206 is controlled by the library apparatus control circuit 1205 to exchange optical information recording media attached to the optical information recording and reproducing apparatuses 1300, 1301, 1302 and 1303.

In response to a request given by the server 1202, the library apparatus control circuit 1205 controls the optical information recording media exchange apparatus 1206 to select desired optical recording media from the plurality of optical information recording media and send the selected optical recording media to the optical information recording and reproducing apparatuses 1300, 1301, 1302 and 1303. Before sending data sent from the server 1202 to the optical information recording and reproducing apparatuses 1300, 1301, 1302 and 1303, the library apparatus control circuit 1205 divides the data into a plurality of data strings, adds a CRC to each data string, conducts scrambling, and then adds an error correction code. Furthermore, before sending data sent from the optical information recording and reproducing apparatuses 1300, 1301, 1302 and 1303 to the server 1202, the library apparatus control circuit 1205 conducts error correction processing, conducts descrambling, and conducts error detection processing using the CRC.

The data library apparatus 1201 incorporates a plurality of optical information recording and reproducing apparatuses, and the data library apparatus 1201 can conduct recording and reproducing on a plurality of optical information recording media simultaneously. As a result, the data library apparatus 1201 can record and reproduce data fast.

For example, optical information recording media are attached to the optical information recording and reproducing apparatuses 1300, 1301, 1302 and 1303, respectively. The optical information recording and reproducing apparatuses 1300, 1301, 1302 and 1303 record data simultaneously. At this time, four optical information recording and reproducing apparatuses operate in parallel. As a result, data can be recorded at a speed which is four times as fast as a speed of one optical information recording and reproducing apparatus.

Figure 13:
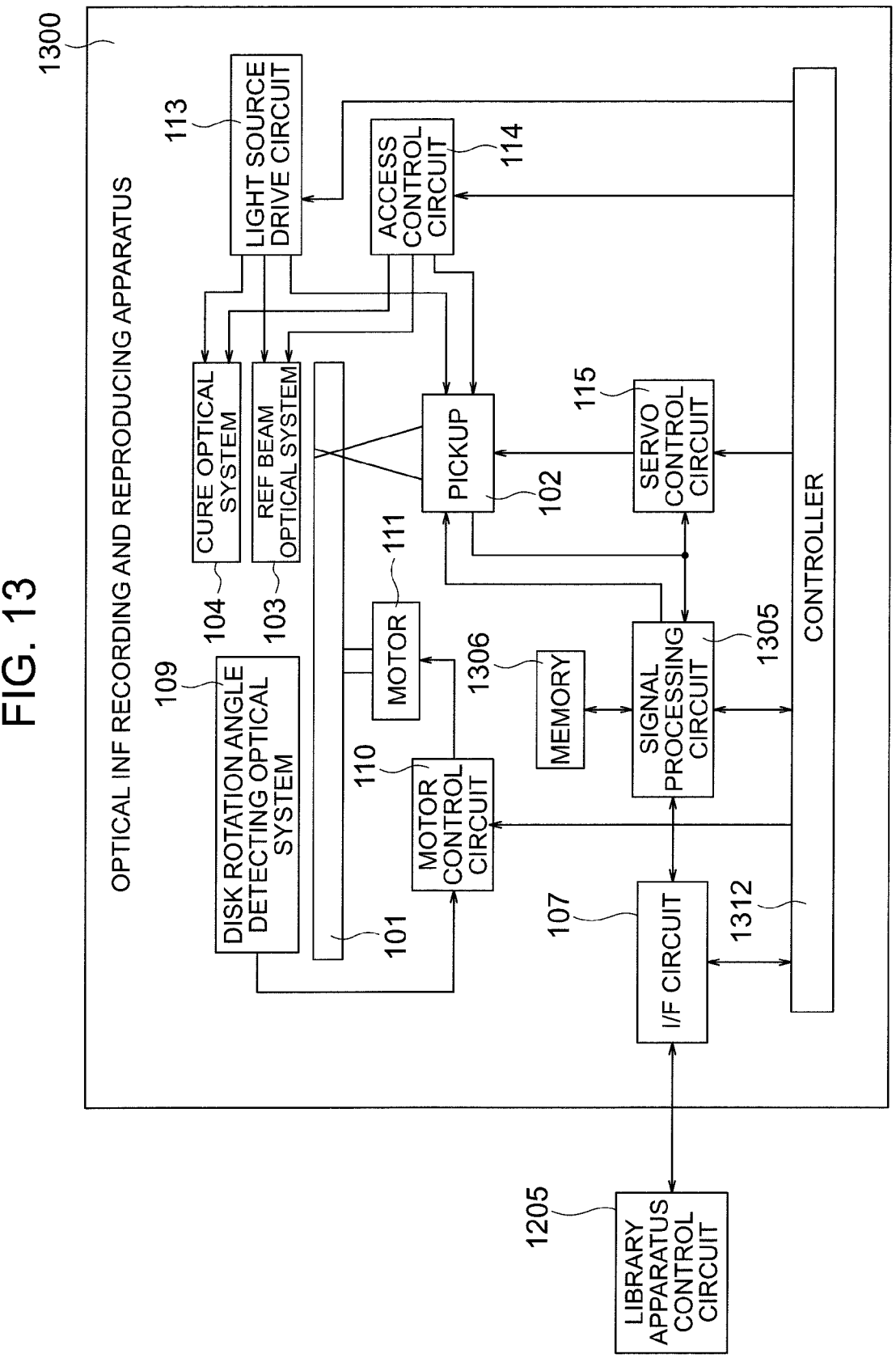
FIG. 13 is a block diagram showing a configuration of an optical information recording and reproducing apparatus in a fourth embodiment.

FIG. 13 is a block diagram showing a configuration of the optical information recording and reproducing apparatus 1300 in the fourth embodiment. Description of parts common to those in FIG. 1 will be omitted.

The optical information recording and reproducing apparatus 1300 is connected to the library apparatus control circuit 1205. The optical information recording and reproducing apparatus 1300 records data, which is input from the library apparatus control circuit 1205, onto the optical information recording media 101. Furthermore, the optical information recording and reproducing apparatus 1300 outputs data, which is reproduced from the optical information recording media 101, to the library apparatus control circuit 1205. Since the pickup 102 is configured to be movable in the radial direction, information recording and reproducing can be conducted over the whole face of the optical information recording and reproducing media 101 by using holography.

A signal processing circuit 1305 sends data, which is sent from the library apparatus control circuit 1205 via the interface circuit 107, to a memory 1306, converts the data to two-dimensional data, repeats the conversion by a number of times corresponding to one page data, and thereby constitutes two-dimensional data corresponding to one page. The signal processing circuit 1305 adds markers, which become reference in image position detection and image distortion correction at the time of reproducing, to the two-dimensional data constituted in this way, and sends resultant data to the pickup 102.

Or the signal processing circuit 1305 receives the detected image data from the pickup 102, detects an image position by using the markers included in the image data as reference, corrects image distortions such as the inclination, magnification and distortion, then conducts binarization processing, removes the markers, thereby acquires two-dimensional data corresponding to one page, and stores the two-dimensional data into the memory 1306. The signal processing circuit 1305 converts the two-dimensional data obtained in this way to a plurality of data strings, and then sends resultant data strings to the library apparatus control circuit 1205.

The error correction code addition, error correction processing, scramble processing, and CRC processing are conducted by the library apparatus control circuit 1205.

The memory 1306 is a storage unit for temporarily storing data. The memory 1306 is controlled by the signal processing circuit 1305, and used as a buffer memory. Since the memory 1306 is not used for error correction code addition and error correction processing, scramble processing, and CRC processing, the memory 1306 can be made smaller than the memory mounted on the optical information recording and reproducing apparatus in the first embodiment.

The memory 1306 may be any memory as long as it can retain data, such as, for example, the SSD, besides the DRAM and the SRAM. The memory 1306 may be the HDD.

The interface circuit 107 conveys a recording/reproducing order given by the library apparatus control circuit 1205, to a controller 1312. Furthermore, the interface circuit 107 sends data sent from the signal processing circuit 1305, to the library apparatus control circuit 1205. Furthermore, the interface circuit 107 sends data sent from the library apparatus control circuit 1205, to the signal processing circuit 1305. The interface circuit 107 conducts data transfer based on a transfer system such as, for example, the SATA, the SAS or the like.

The controller 1312 controls respective units in the optical information recording and reproducing apparatus 1300, and conducts data recording processing and data reproducing processing of the optical information recording media 101. The controller 1312 may be constituted by using, for example, a CPU. Alternatively, an arbitrary control circuit or a dedicated circuit such as an ASIC may be used.

Operation of the optical information recording and reproducing apparatus 1300 conducted when recording data on the optical information recording media 101 will now be described. Upon attachment of the optical information recording media 101 to the optical information recording and reproducing apparatus 1300, the controller 1312 conducts adjustment processing of the respective units, moves the pickup 102 and the reference beam optical system 103 respectively to predetermined positions by using the motor control circuit 110 and the access control circuit 114, reads out management information from the optical information recording media 101 via the pickup 102 and the signal processing circuit 1305, and stores the management information into the memory 1306.

And the controller 1312 moves the pickup 102, the reference beam optical system 103 and the cure optical system 104 to their respective desired positions, by using the motor control circuit 110 and the access control circuit 114.

Upon sending of data from the library apparatus control circuit 1205 to the optical information recording and reproducing apparatus 1300, the controller 1312 receives the data by using the interface circuit 107, stores the data into the memory 1306.

And the controller 1312 moves the pickup 102 and the reference beam optical system 103 to their respective desired positions by using the motor control circuit 110 and the access control circuit 114. The controller 1312 conducts precure by using the cure optical system 104. The controller 1312 reads out data from the memory 1306, adds markers to the data, sends resultant data to the pickup 102, and records the resultant data onto the optical information recording media 101, by using the signal processing circuit 1305. And the controller 1312 conducts the postcure by using the cure optical system 104.

When conducting verify processing, i.e., when ascertaining whether recorded data can be read out correctly, image data detected from the optical information recording media 101 by the pickup 102 is sent to the signal processing circuit 1305, the image position is detected by using the markers as reference, and distortions are corrected. Then, binarization processing is conducted, and two-dimensional data is acquired and stored into the memory 1306. And the two-dimensional data is sent to the library apparatus control circuit 1205 via the interface circuit 107, and ascertainment is conducted in the library apparatus control circuit 1205.

Operation of the optical information recording and reproducing apparatus 1300 conducted when reproducing data from the optical information recording media 101 will now be described. Upon attachment of the optical information recording media 101 to the optical information recording and reproducing apparatus 1300, the controller 1312 conducts adjustment processing of the respective units, moves the pickup 102 and the reference beam optical system 103 to their respective predetermined positions by using the motor control circuit 110 and the access control circuit 114, reads out management information from the optical information recording media 101 via the pickup 102 and the signal processing circuit 1305, and stores the management information into the memory 1306.

And the controller 1312 moves the pickup 102 and the reference beam optical system 103 to their respective desired positions by using the motor control circuit 110 and the access control circuit 114. The controller 1312 writes data reproduced from the optical information recording media 101, into the memory 1306. The controller 1312 sends the data to the library apparatus control circuit 1205 via the interface circuit 107.

FIG. 14 is a block diagram showing a configuration of the library apparatus control circuit 1205 in the fourth embodiment. The library apparatus control circuit 1205 includes a signal processing circuit 1405, a memory 1406, interface circuits 1407 and 1408, and a controller 1412.

The signal processing circuit 1405 is controlled by the controller 1412. The signal processing circuit 1405 stores data sent from the server via the interface circuit 1407, into the memory 1406, conducts various kinds of signal processing on the memory, and sends resultant data to the optical information recording and reproducing apparatus via the interface circuit 1408.

Or the signal processing circuit 1405 stores data sent from the optical information recording and reproducing apparatus via the interface circuit 1408, into the memory 1406, conducts various kinds of signal processing on the memory, and sends resultant data to the server via the interface circuit 1407.

The memory 1406 is a storage unit for temporarily storing data. The memory 1406 is controlled by the signal processing circuit 1405, and used as a buffer memory, an error correction code adding memory, an error correcting memory, and the like. The memory 1406 may be any memory as long as it can retain data, such as, for example, the SSD, besides the DRAM and the SRAM. The memory 1406 may be the HDD.

The interface circuit 1407 conveys a recording/reproducing order given by the server, to the controller 1412. Furthermore, the interface circuit 1407 sends data sent from the signal processing circuit 1405, to the server. Furthermore, the interface circuit 1407 sends data sent from the server, to the signal processing circuit 1405.

The interface circuit 1408 sends a recording/reproducing order sent from the controller 1412, to the optical information recording and reproducing apparatus. Furthermore, the interface circuit 1408 sends data sent from the signal processing circuit 1405, to the optical information recording and reproducing apparatus. Furthermore, the interface circuit 1408 sends data sent from the optical information recording and reproducing apparatus, to the signal processing circuit 1405.

The interface circuits 1407 and 1408 conduct data transfer based on a transfer system such as, for example, the SATA, the SAS or the like.

The host computer 108 sends data to the optical information recording and reproducing apparatus 100, and orders the optical information recording and reproducing apparatus 100 to record the data. Furthermore, the host computer 108 orders the optical information recording and reproducing apparatus 100 to reproduce data, and receives the data.

The controller 1412 controls respective units in the library apparatus control circuit 1205, selects desired optical information recording media via the optical information recording media exchange apparatus 1206, and conducts data recording processing and data reproducing processing via the optical information recording and reproducing apparatus. The controller 1412 may be constituted by using, for example, a CPU. Alternatively, an arbitrary control circuit or a dedicated circuit such as an ASIC may be used.

The memory control circuit 200 in the signal processing circuit 1405 conducts data writing into/reading from the memory 1406 in response to a data input/output request from each circuit.

The CRC operation circuit 201 operates a CRC of each data string on the memory 1406 and adds the CRC to the data string. Or the CRC operation circuit 201 operates a CRC of each data string and detects an error.

The scramble circuit 202 conducts scrambling on data strings in the memory 1406. Or the scramble circuit 202 descrambles the data strings.

The error correction and error correction code addition circuit 203 adds an error correction code on the memory 1406. Or the error correction and error correction code addition circuit 203 corrects an error included in data which is stored in the memory 1406.

Although not illustrated, respective circuits are controlled by the controller 1412. Or a dedicated controller may be provided in the signal processing circuit 1405 to control the respective circuits.

Operation of the signal processing circuit 1405 conducted when recording data on the optical information recording media 101 will now be described.

The signal processing circuit 1405 stores data, which is sent from the interface circuit 1407, into the memory 1406 via the memory control circuit 200, divides the data into a plurality of data strings, adds a CRC to each data string by using the CRC operation circuit 201 to make possible error detection at the time of reproducing, makes the number of on-pixels nearly equal to the number of off-pixels, conducts scrambling of adding a pseudo random number data string to each data string by using the scramble circuit 202 with the object of preventing repetition of the same pattern, then adds an error correction code such as the Reed-Solomon code by using the error correction and error correction code addition circuit 203 to make possible error correction at the time of reproducing, and sends resultant data strings to the interface circuit 1408.

When conducting verify processing, the signal processing circuit 1405 conducts error correction processing on data stored into the memory 1406 via the interface circuit 1408, by using the error correction and error correction code addition circuit 203, conducts descrambling by using the scramble circuit 202, and conducts error detection processing by using the CRC operation circuit 201.

If an error is detected in the error correction processing, the CRC operation processing, or the like, then the signal processing circuit 1405 copies original data of the data, intrudes the copied data at the head of the next cure to be recorded, and pastes the copied data. At that time, data in the next cure to be recorded are shifted backward by that amount.

Operation of the signal processing circuit 1405 conducted when reproducing data from the optical information recoding media 101 will now be described.

The signal processing circuit 1405 conducts error correction processing on data stored into the memory 1406 via the interface circuit 1408, by using the error correction and error correction code addition circuit 203, conducts descrambling by using the scramble circuit 202, conducts error detection processing by using the CRC operation circuit 201, and sends resultant data to the interface circuit 1407.

Owing to the configuration described heretofore, effects similar to those in the first embodiment can be obtained in the fourth embodiment according to the present invention.

In addition, a plurality of optical information recording and reproducing apparatuses are incorporated, and recording and reproducing can be conducted on a plurality of optical information recording media simultaneously. As a result, fast data recording and reproducing can be conducted.

In addition, the error correction processing, error correction code addition processing, and CRC operation processing are executed by one library apparatus control circuit. The memory in each of the plurality of optical information recording and reproducing apparatuses need only have a minimum capacity required for buffering.

In the present embodiment, an example in which the data library apparatus conducts error correction processing and retry data generation is shown. Alternatively, however, the server may conduct the error correction processing and retry data generation.

The present invention is not restricted to the above-described embodiments, but various modifications are included. For example, the embodiments have been described in detail in order to describe the present invention intelligibly, and each of the embodiments is not necessarily restricted to the configuration having all described components. Furthermore, it is possible to replace a part of a configuration in an embodiment by a part of a configuration in another embodiment, and it is possible to add a part of a configuration in an embodiment to a configuration in another embodiment. Furthermore, as for a part of a configuration in each embodiment, it is possible to conduct addition, deletion, and replacement of a part of a configuration in another embodiment.

As for each of the above-described configurations, functions, processing units, and processing means, a part or the whole thereof may be implemented by hardware by, for example, designing using integrated circuits. Each of the above-described configurations, functions, processing units, and processing means may be implemented by software by using a processor which interprets and executes a program implementing each function. Information such as a program, a table, and a file implementing each function can be stored in a storage device such as a memory, a hard disk, or an SSD (Solid State Drive) or recording media such as an IC card or an SD card.

As for control lines and information lines, those considered to be necessary for description are shown. All control lines and information lines on products are not necessarily shown. As a matter of fact, it may be considered that almost all components are connected to each other.

It should be further understood by those skilled in the art that the foregoing description has been made on embodiments of the invention and that various changes and modifications may be made in the invention without departing from the spirit of the invention and the scope of the appended claims.

The invention claimed is:

1. An optical information recording and reproducing apparatus for recording data onto optical information recording media and reproducing data from the optical information recording media, the optical information recording and reproducing apparatus comprising:

a memory which temporarily stores data sent from a host computer;

a cure optical system which conducts precure on the optical information recording media as a preprocess for recording and conducting postcure on the optical information recording media as a postprocess for recording;

a pickup which records data stored in the memory onto an area subjected to the precure, in order;

a signal processing circuit which ascertains a recording quality of the recorded data;

a data request circuit which requests the host computer to retransfer data which has caused a verify error when the verify error is detected; and a controller which generates retry data from retransferred data;

wherein precure being conducted by the cure optical system, data being recorded in a pertinent place by the pickup, and postcure being conducted by the cure optical system, and upon detection of a verify error by the signal processing circuit, the host computer being requested to retransfer data by the data request circuit, retransferred data being recorded onto the optical information recording media by the pickup; and wherein precure and data recording on the optical information recording media are conducted in a predetermined unit a predetermined number of times, then postcure is conducted on a place where data are recorded in a predetermined unit a predetermined number of times, and verify processing is conducted on the place where data are recorded in a predetermined unit a predetermined number of times, upon detection of a verify error, the host computer is requested to retransfer data which has caused the verify error, received data is intruded in a next scheduled recording quantity unit and stored in the memory in order, when conducting precure and data recording in a predetermined unit a predetermined number of times next time, the data stored in the memory is recorded onto the optical information recording media.

2. The optical information recording and reproducing apparatus according to claim 1, wherein the predetermined unit is a range of the optical information recording media irradiated with a laser beam when executing single precure and postcure.

3. The optical information recording and reproducing apparatus according to claim 1, wherein the predetermined number of times is a number of times of repetition in case where precure and data recording in a predetermined unit are repeated until nonphotochemical reaction in a first recording place in a predetermined unit is finished.

\* \* \* \* \*